US012002228B2

(12) United States Patent
Sameer

(10) Patent No.: US 12,002,228 B2
(45) Date of Patent: Jun. 4, 2024

(54) SYSTEMS AND METHODS FOR IDENTIFYING INCLINED REGIONS

(71) Applicant: HERE Global B.V., Eindhoven (NL)

(72) Inventor: Priyank Sameer, Mumbai Maharashtra (IN)

(73) Assignee: HERE GLOBAL B.V., Eindhoven (NL)

( * ) Notice: Subject to any disclaimer, the term of this patent is extended or adjusted under 35 U.S.C. 154(b) by 382 days.

(21) Appl. No.: 17/402,170

(22) Filed: Aug. 13, 2021

(65) Prior Publication Data

US 2023/0046376 A1 Feb. 16, 2023

(51) Int. Cl.
*G06T 7/507* (2017.01)
*G06T 3/4038* (2024.01)
(Continued)

(52) U.S. Cl.
CPC ............ *G06T 7/507* (2017.01); *G06T 3/4038* (2013.01); *G06T 7/521* (2017.01); *G06V 20/176* (2022.01); *G06V 40/103* (2022.01); *G06T 2207/10032* (2013.01); *G06T 2207/30181* (2013.01); *G06V 2201/07* (2022.01)

(58) Field of Classification Search
CPC . G06T 2207/10032; G06T 2207/30181; G06T 2207/30184; G06T 2207/30196; G06T 3/4038; G06T 7/507; G06T 7/521; G06T 7/73; G06V 20/13; G06V 20/17;
(Continued)

(56) References Cited

U.S. PATENT DOCUMENTS 6,856,897 B1 2/2005 Phuyal et al.
7,446,886 B2 11/2008 Aufmuth et al.
(Continued)

FOREIGN PATENT DOCUMENTS

CN 105574488 A 5/2016
DE 102020004689 * 10/2020 .......... B60W 40/076
(Continued)

OTHER PUBLICATIONS

Wang et al., "Shadow extraction and application in pedestrian detection", EURASIP Journal on Image and Video Processing vol. 2014, Article No. 12 (2014), 10 pages.

*Primary Examiner* — Zhiyu Lu

(57) ABSTRACT

Systems and methods for identifying inclined regions are provided. In one aspect, a method is provided that includes receiving shadow data for at least one first ground object in a first region, wherein each first ground object is depicted in one overhead image of the first region, wherein the shadow data comprises a length of the respective first ground object as identified from the respective overhead image; receiving shadow data for at least one second comparable ground object in a second region, wherein each second ground object is depicted in one overhead image of the second region, wherein the shadow data comprises a length of the respective second ground object as identified from the respective overhead image; calculating a statistical measure describing the variability of the shadow lengths between objects in the first region and the second region; comparing the statistical measure to a predetermined threshold; and based on the comparison, identifying that the first region is inclined relative to the second region.

20 Claims, 9 Drawing Sheets

(51) Int. Cl.
    *G06T 7/521*          (2017.01)
    *G06V 20/10*         (2022.01)
    *G06V 40/10*         (2022.01)

(58) Field of Classification Search
    CPC . G06V 20/176; G06V 2201/07; G06V 40/103
    See application file for complete search history.

(56) References Cited

U.S. PATENT DOCUMENTS

| | | |
|---|---|---|
| 9,396,584 B2 | 7/2016 | Jones et al. |
| 2015/0161442 A1* | 6/2015 | Sadka .................... G06Q 50/06 |
| | | 382/113 |
| 2015/0178926 A1* | 6/2015 | Jones ..................... G06V 20/13 |
| | | 345/440 |
| 2018/0204469 A1* | 7/2018 | Moster ................. G08G 5/0069 |
| 2020/0408886 A1* | 12/2020 | Mercier .................. G01C 3/22 |

FOREIGN PATENT DOCUMENTS

| | | | | |
|---|---|---|---|---|
| JP | 2003140544 A | | 5/2003 | |
| KR | 101217853 B1 | | 1/2013 | |
| KR | 20160061640 A | | 6/2016 | |
| WO | WO 2014033707 | * | 3/2014 | ........... G06Q 10/043 |

\* cited by examiner

Image 1, region 1, time $T_1$     Image 2, region 2, time $T_2$

Time $T_1$

SYSTEMS AND METHODS FOR IDENTIFYING INCLINED REGIONS

TECHNICAL FIELD

The present application relates to methods, apparatus, systems and computer program products for identifying inclined regions. In particular, the present application relates to using the shadows cast by ground objects and visible in overhead images to identify inclined regions.

BACKGROUND

Some geographical regions are substantially flat whereas other regions are inclined. Some regions are more or less inclined (i.e. more or less steep/sloping) than other regions. Examples of inclined regions are stairs/steps and inclined roads. Currently there are methods for identifying inclined regions, for example by analysing light detection and ranging (LIDAR) data or street-level images of geographic regions. However, there is still room for improvement in the field of inclined region identification.

The listing or discussion of a prior-published document or any background in this specification should not necessarily be taken as an acknowledgement that the document or background is part of the state of the art or is common general knowledge.

SUMMARY

According to a first aspect, there is provided a computer-implemented method for identifying region incline from at least one temporally-compatible overhead image, the method comprising:

receiving shadow data for at least one first ground object in a first region, wherein each first ground object is depicted in one overhead image of the first region, wherein the shadow data comprises a length of the respective first ground object as identified from the respective overhead image;

receiving shadow data for at least one second comparable ground object in a second region, wherein each second ground object is depicted in one overhead image of the second region, wherein the shadow data comprises a length of the respective second ground object as identified from the respective overhead image;

calculating a statistical measure describing the variability of the shadow lengths between objects in the first region and the second region;

comparing the statistical measure to a predetermined threshold; and based on the comparison, identifying that the first region is inclined relative to the second region.

The first and second ground objects may be pedestrians. The first and second ground objects may be items of street furniture of the same type. The first and second ground objects may all be one of: streetlamps, traffic lights, road signs, telephone booths, mail boxes, street bollards, telephone poles and electricity pylons.

The statistical measure describing the variability of the shadow lengths between objects in the first region and the second region may comprise one or more of: a difference, a standard deviation, a variance, and an interquartile range. The statistical measure may be an absolute value. The statistical measure may be a relative value.

The type of statistical measure calculated may depend on one or more of:

the number of the at least one first ground objects and/or the number of the at least one second ground objects for which shadow data is received;

the number of overhead images from which the at least one first ground object and at least one second ground objects have been identified; and the type of ground object.

The type and/or value of the predetermined threshold may depend on one or more of:

the number of the at least one first ground objects and/or the number of the at least one second ground objects for which shadow data is received;

the number of overhead images from which the at least one first ground object and at least one second ground objects have been identified; and the type of ground object.

The at least one overhead image may comprises at least one satellite image, at least one image captured by an unmanned aerial vehicle, or at least one image captured by a manned aerial vehicle.

The at least one temporally-compatible overhead image may comprise one of:

a single image;

two images captured on the same day at substantially the same time;

two images captured on the same day within a short time threshold; and two images captured on consecutive days at substantially the same time.

The first region may be within a distance threshold of the second region. The distance threshold may be one or more of: 10 meters, 50 meters, 100 meters, 500 meters, 1 kilometer, 5 kilometers, 10 kilometers and 50 kilometers. The first region and second region may be adjacent geographic regions.

One of the first region and the second region may be a default region for which an inclination is known.

The at least one first ground object may comprise a first pedestrian depicted in a first overhead image of the first region, and the at least one second comparable ground object may comprise the same first pedestrian depicted in a second overhead image of the second region, where the first overhead image and the second overhead image are captured a short time period apart on the same day, and the first pedestrian is tracked moving between the first region as depicted in the first overhead image and the second region as depicted in the second overhead image.

The statistical measure may comprise a difference between the shadow length of the first pedestrian as identified from the first overhead image of the first region and the shadow length of the first pedestrian as identified from the second overhead image of the second region.

The at least one first ground object and the at least one second ground object may both comprise multiple pedestrians tracked moving between the first region as depicted in the first overhead image and the second region as depicted in the second overhead image.

All of the at least one first ground object and at least one comparable second ground object may be depicted in the same one overhead image.

The method may further comprise: receiving the at least one temporally-compatible overhead image of the regions, and identifying the at least one first ground object and at least one second comparable ground object from the at least one temporally-compatible overhead images.

The method may further comprise identifying the shadow of each ground object from its respective overhead image.

The method may further comprise determining the respective lengths of each of the ground objects' shadows. The length of a ground object's shadow may be the longest distance between two points on the edge of the shadow. The length of a ground object's shadow may be the longest distance in a dominant direction of a shadow.

The method may further comprise defining the first region and second region after receiving the shadow data for the at least one first ground object and at least one comparable second ground object.

The method may further comprise updating a geographic database to indicate that the first region is inclined relative to the second region.

The method may further comprise identifying that the first region is more inclined than the second region, based on the comparison and at least one piece of additional information. The at least one piece of additional information may comprise one of more of: the inclination of one of the first region and the second region, the direction of the Sun relative to the first and second regions, the elevation of the Sun relative to the first and second regions, the time of day that the one or more overhead images were captured, and the length of shadow cast by a ground object of average height on flat ground at the time the overhead images were captured.

Identifying that the first region is inclined relative to the second region may be based on the statistical measure exceeding the predetermined threshold.

The identification that the first region is inclined relative to the second regions may be an identification that at least part of the first region is inclined relative to at least part of the second region. The method may further comprises repeating the receiving, receiving, calculating, comparing and identifying steps of the first aspect for a first subregion of the first region and a second subregion of the second region.

According to a second aspect, there is provided a computer-implemented method for identifying region incline from overhead imagery, the method comprising:
  receiving shadow data for at least one first ground object depicted in a first region of an overhead image, wherein the shadow data comprises a length of the respective first ground object as identified from the overhead image;
  receiving shadow data for at least one second comparable ground object depicted in a second region of the overhead image, wherein the shadow data comprises a length of the respective second ground object as identified from the overhead image;
  calculating a statistical measure describing the variability of the shadow lengths between objects in the first region and the second region;
  comparing the statistical measure to a predetermined threshold; and
  based on the comparison, identifying that the first region is inclined relative to the second region.

The steps of any method disclosed herein do not have to be performed in the exact order disclosed, unless explicitly stated or understood by the skilled person.

According to a third aspect, there is provided an apparatus comprising at least one processor and at least one memory including computer program code, the at least one memory and the computer program code configured to, with the at least one processor, cause the apparatus to:
  receive shadow data for at least one first ground object in a first region, wherein each first ground object is depicted in one overhead image of the first region, wherein the shadow data comprises a length of the respective first ground object as identified from the respective overhead image;
  receive shadow data for at least one second comparable ground object in a second region, wherein each second ground object is depicted in one overhead image of the second region, wherein the shadow data comprises a length of the respective second ground object as identified from the respective overhead image;
  calculate a statistical measure describing the variability of the shadow lengths between objects in the first region and the second region;
  compare the statistical measure to a predetermined threshold; and
  based on the comparison, identify that the first region is inclined relative to the second region.

The apparatus may be further caused to perform each of the method steps discussed above in relation to the first aspect. The apparatus may be caused to perform one or more steps of the methods disclosed elsewhere in the present disclosure.

According to a fourth aspect, there is provided an apparatus comprising at least one processor and at least one memory including computer program code, the at least one memory and the computer program code configured to, with the at least one processor, cause the apparatus to:
  receive shadow data for at least one first ground object depicted in a first region of an overhead image, wherein the shadow data comprises a length of the respective first ground object as identified from the overhead image;
  receive shadow data for at least one second comparable ground object depicted in a second region of the overhead image, wherein the shadow data comprises a length of the respective second ground object as identified from the overhead image;
  calculate a statistical measure describing the variability of the shadow lengths between objects in the first region and the second region;
  compare the statistical measure to a predetermined threshold; and
  based on the comparison, identify that the first region is inclined relative to the second region.

The apparatus may be further caused to perform each of the method steps discussed above in relation to the first aspect. The apparatus may be caused to perform one or more steps of the methods disclosed elsewhere in the present disclosure.

Corresponding computer programs for implementing one or more steps of the methods disclosed herein are also within the present disclosure and are encompassed by one or more of the described examples.

For example, in a fifth aspect there is provided a computer program comprising instructions which, when the program is executed by a computer, cause the computer to:
  receive shadow data for at least one first ground object in a first region, wherein each first ground object is depicted in one overhead image of the first region, wherein the shadow data comprises a length of the respective first ground object as identified from the respective overhead image;
  receive shadow data for at least one second comparable ground object in a second region, wherein each second ground object is depicted in one overhead image of the second region, wherein the shadow data comprises a length of the respective second ground object as identified from the respective overhead image;

calculate a statistical measure describing the variability of the shadow lengths between objects in the first region and the second region;

compare the statistical measure to a predetermined threshold; and based on the comparison, identify that the first region is inclined relative to the second region.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable storage medium, which may be a physical computer readable storage medium such as a disc or a memory device, may be a non-transitory storage medium, or may be embodied as a transient signal. Such a transient signal may be a network download, including an internet download.

For example, in a sixth aspect, there is provided a computer-readable storage medium comprising instructions which, when executed by a computer, cause the computer to:

receive shadow data for at least one first ground object in a first region, wherein each first ground object is depicted in one overhead image of the first region, wherein the shadow data comprises a length of the respective first ground object as identified from the respective overhead image;

receive shadow data for at least one second comparable ground object in a second region, wherein each second ground object is depicted in one overhead image of the second region, wherein the shadow data comprises a length of the respective second ground object as identified from the respective overhead image;

calculate a statistical measure describing the variability of the shadow lengths between objects in the first region and the second region;

compare the statistical measure to a predetermined threshold; and based on the comparison, identify that the first region is inclined relative to the second region.

In any of the third, fourth, fifth and sixth aspects above, each overhead image depicting the first and/or second region may be temporally-compatible with each other overhead image. In the third and fourth aspects, the apparatus may be considered to be an apparatus for identifying region incline from overhead imagery.

The present disclosure includes one or more corresponding aspects, examples or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

Some example embodiments will now be described with reference to the accompanying drawings, in which.

DETAILED DESCRIPTION

Figure 1:
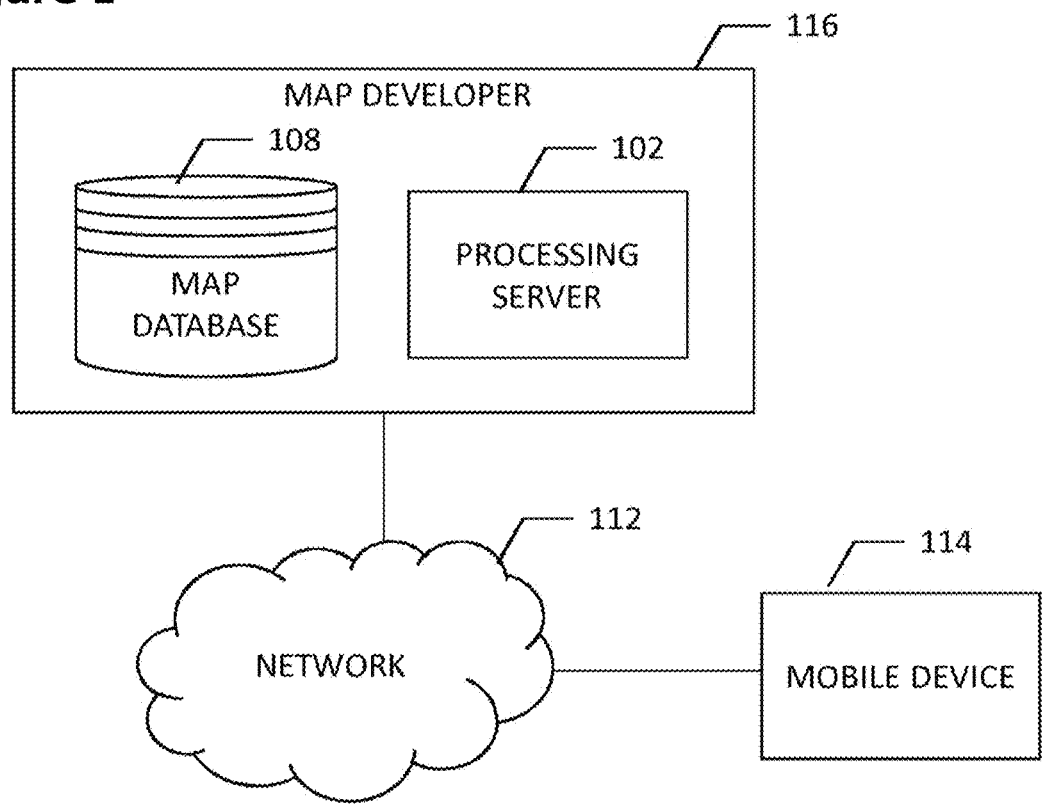
FIG. 1 shows a system according to one embodiment of the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein. Rather, these embodiments are provided so that this disclosure will satisfy applicable legal requirements. Where applicable, like reference numerals refer to like elements.

Geographic databases (for example geographic databases for use in navigation) typically contain representations of geographic regions such as roads, paths, walkways, squares or plazas. The database may indicate features or parameters associated with particular geographic regions, for example that a road is one-way or that a plaza contains a particular point of interest.

However, geographic databases typically do not include any indication about the inclination of a geographic region (equivalently the 'slope' or 'gradient'). This may be because it is difficult, time-consuming and resource-intensive to obtain accurate and reliable information about inclined geographic regions. For example, steep roads or stairs can be identified by obtaining and analysing light detection and ranging (LIDAR) data or street-level images of geographic regions. This is time-consuming and resource-intensive, and therefore it may not be a practical option to identify inclined geographic regions across a large area (e.g. across a town, city, county, state or country).

The present disclosure relates to methods, apparatus, and computer program products for identifying region incline from at least one temporally-compatible overhead image. In particular, the present disclosure relates to identifying that a first region is inclined relative to a second region using the shadows cast by ground objects in the first and second regions as depicted in temporally-compatible overhead images of the two regions.

Shadows

Shadows are formed when an object blocks light from a light source from reaching a three-dimensional space behind the object. This three-dimensional space is a 'shadow volume'. The intersection of a two-dimensional (2D) ground surface with the three-dimensional (3D) shadow volume is a 2D cross-section of the 3D shadow volume. This is commonly known as the 'shadow' cast by the object.

The shape and relative dimensions of a shadow depend on various factors, including: the 3D shape of the object casting the shadow, the size of the object, the distance of the light source from the object, and the angle of elevation of the light source relative to the object. For example, when the Sun is low in the sky, the shadows caused are longer (and thinner, relatively speaking) than the object casting the shadow. When the Sun is high in the sky, shadows are shorter (and wider, relatively speaking) than the object casting the shadow.

Another factor is the angle of elevation of the light source relative to the 2D ground surface on which the shadow is cast. Flat or uninclined ground is a ground surface that is substantially perpendicular to the direction of gravity. Inclined ground is a ground surface that is not substantially perpendicular to the direction of gravity. The angle of elevation of a light source (e.g. the Sun) relative to an inclined ground surface will be smaller or larger than the angle of elevation relative to flat ground. All other factors being equal, an object on inclined ground and illuminated by a light source will cast a different shadow to that same object on flat ground, as will be explained in the next section with reference to FIGS. 4a-5b.

Figure 3:
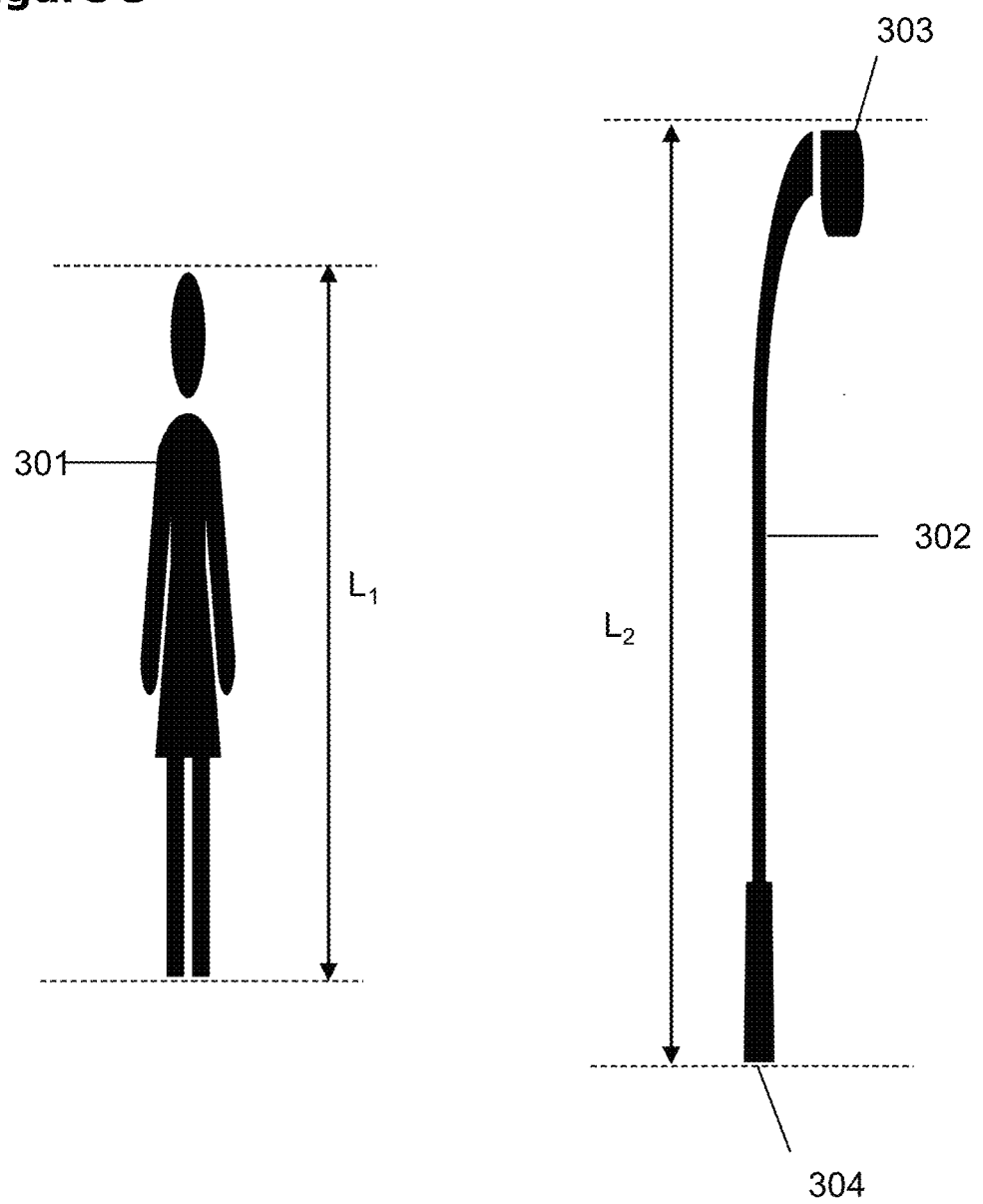
FIG. 3 shows schematically two example shadows.

Shadows have two-dimensional shapes and sizes. However, a one-dimensional distance (a 'length') can be chosen to characterise a size of the shadow, allowing comparisons between different shadows. FIG. 3 shows a shadow 301 cast by a pedestrian and a shadow 302 cast by a lamppost, according to an example. In some embodiments, the length of each shadow is defined as the longest distance between two points on the edge of the shadow, for example the straight line distance between points 303 and 304 for lamppost shadow 302. In some embodiments, the length of each shadow is the longest distance in the dominant direction of a shadow, such as length L1 of pedestrian shadow 301 and length L2 of lamppost shadow 302. A dominant direction of a shadow may be determined from analysis of one or multiple shadows, by considering the location of the Sun relative to the location of the object casting the shadow, or by another method.

The length of a shadow can be defined in two ways. The ground length is the length of the shadow measured along the (flat/uninclined) ground. The overhead length is the length of the shadow as visible from an overhead perspective, which is the component of the ground length that is parallel to flat ground (i.e. perpendicular to the direction of gravity). For shadows cast on flat ground, the ground length and overhead length are the same. For shadows cast on inclined ground, the overhead length is shorter than the ground length. In the rest of this description, any instance of 'length' (without qualifier) should be understood to mean overhead length.

Shadows on Inclined and Non-Inclined Ground

Figure 4A:
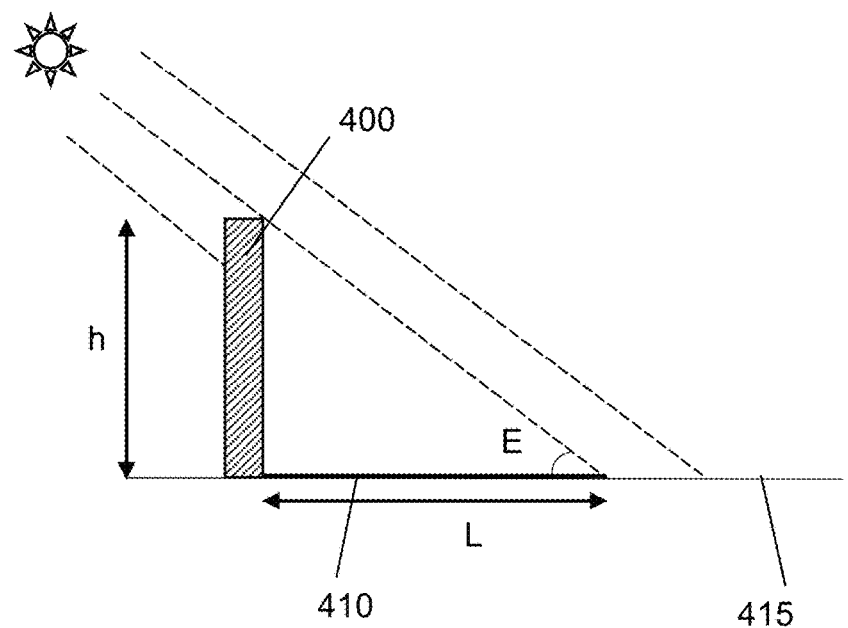
FIG. 4a shows schematically a side perspective of an object illuminated by a light source.

FIG. 4a shows a side perspective of an object 400 illuminated by a light source. The object 400 is located on flat ground 415 and has height h. FIG. 4a also shows (in a darker line) a side perspective of the shadow 410 cast by object 400 due to the light source. The shadow 410 is also cast on flat ground 415.

The angle of elevation of the light source relative to the flat ground surface is E (where E is defined as between 0° and 90°). As shown in FIG. 4a, this angle of elevation E is defined for the last light ray that passes above the object 400 without being blocked by object 400. However for a distant light source (such as the Sun) from which parallel incident light rays are assumed, the angle of elevation of the light source may be defined across an entire geographic region.

The shadow 410 cast by object 400 has a ground length of L. Because the shadow 410 is cast on flat ground, the overhead length is equal to the ground length. Overhead shadow length L is related to the angle of elevation E of the light source and the height h of the object as follows:

$$\tan E = \frac{h}{L} \qquad \text{(Equation 1)}$$

$$L = \frac{h}{\tan E}$$

Figure 4B:
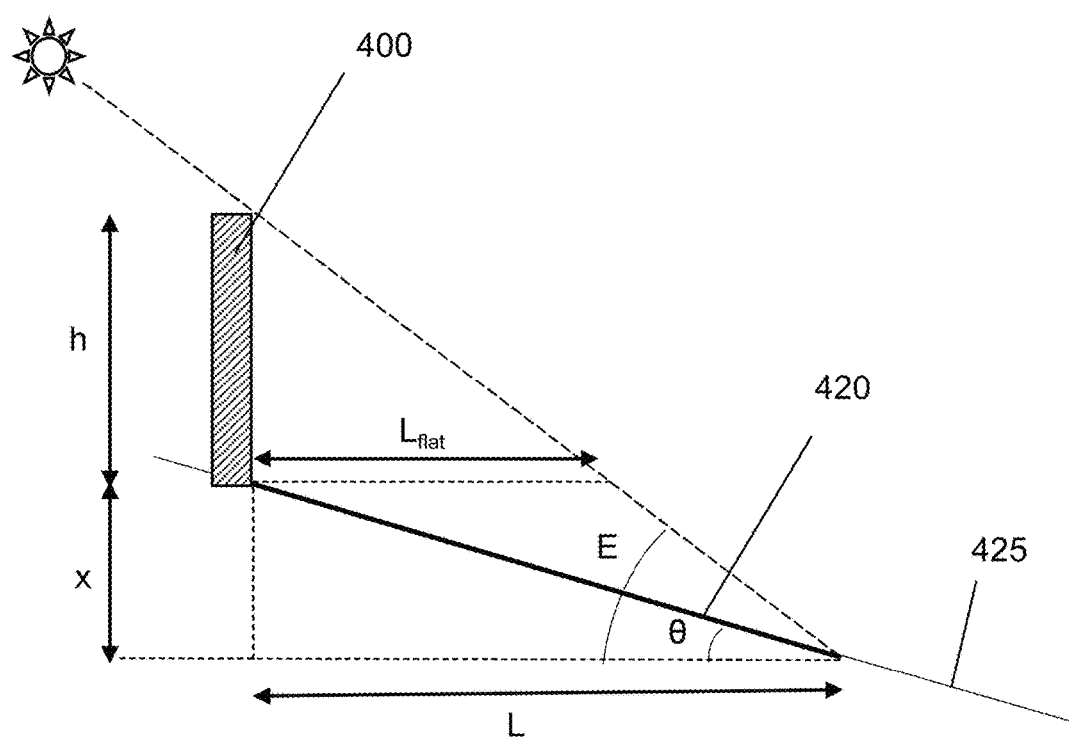
FIG. 4b shows schematically a side perspective of an object illuminated by a light source.

FIG. 4b shows a side perspective of the same object 400 illuminated by the same distant light source, as well as (in a darker line) the shadow 420 cast by the object 400. As in FIG. 4a, the object 400 has the same height h and the light source is at the same angle of elevation E from flat ground.

Unlike FIG. 4a, in FIG. 4b the object 400 is located on inclined ground 425, and the shadow 420 is cast on inclined ground 425. The inclined ground 425 is at a slope of θ relative to flat ground (where θ is defined as between 0° and 90°). With both E and θ defined between 0° and 90°, the inclined ground 425 is inclined to the same side as that in which the light source is elevated. In other words, the angle of elevation E of the light source from flat ground and the slope θ of the inclined ground are measured from flat ground in the same sense/direction of rotation. FIG. 4b shows the overlap between the two angles θ and E. This reduces the angle of elevation of the light source from the ground surface on which shadows are cast (i.e. ground 425) to E−θ.

For shadows cast on inclined ground, the shadow has a component that is parallel to flat ground (i.e. perpendicular to the direction of gravity) and a component that is perpendicular to flat ground (i.e. parallel to the direction of gravity). FIG. 4b shows, as the darker line, a side perspective of shadow 420 on inclined ground 425. The ground length of shadow 420 is the length of the darker line. This can be broken up into two components. Firstly, the overhead length of the shadow 420 (the component parallel to flat ground) is labelled as L. Secondly, the rise of the shadow 420 (the component perpendicular to flat ground) is labelled as x. For ease of comparison, FIG. 4b also shows the length Lflat of the shadow that would be cast if the object were on flat ground (which is the same as length L from FIG. 4a). Both the overhead length L and the ground length of shadow 420 are longer than Lflat.

In FIG. 4b, overhead shadow length L is related to the angle of elevation E of the light source from flat ground, the slope θ of the inclined ground relative to flat ground, the height h of the object, and the rise x of the shadow as follows:

$$\tan\theta = \frac{x}{L} \quad \text{(Equation 2)}$$

$$\tan E = \frac{h+x}{L}$$

$$= \frac{h}{L} + \frac{x}{L}$$

$$= \frac{h}{L} + \tan\theta$$

$$\frac{h}{L} = \tan E - \tan\theta$$

$$L = \frac{h}{\tan E - \tan\theta}$$

When the slope θ of the inclined ground is zero (i.e. for flat ground), this reduces to Equation 1, $$L = \frac{h}{\tan E}.$$

Equation 2 can also be derived from Equation 1 by considering the inclined ground 425 to be a flat ground surface, the angle of elevation of the light source from this flat ground to be E−θ, and the height of the object to be the proportion of h that is perpendicular to the inclined ground 425.

FIG. 4b shows that the overhead length L (and the longer ground length) of shadow 420 is longer than Lflat. This can also be shown mathematically. In FIG. 4b, both the angle of elevation E of the light source and the slope θ of the inclined ground are between 0° and 90°, measured from flat ground in the same sense. The angle of elevation E is inherently larger than inclined ground slope θ, otherwise the light source would not be visible from the inclined ground. Tan is a positive monotonically increasing function between 0° and 90°, and therefore tan E−tan θ is a positive value that is smaller than tan E. Accordingly, $$\frac{h}{\tan E - \tan\theta}$$

is a positive value that is larger than $$\frac{h}{\tan E},$$

making overhead shadow length L larger for inclined ground which is inclined to the same side as that in which the light source is elevated than for flat ground.

Figure 5A:
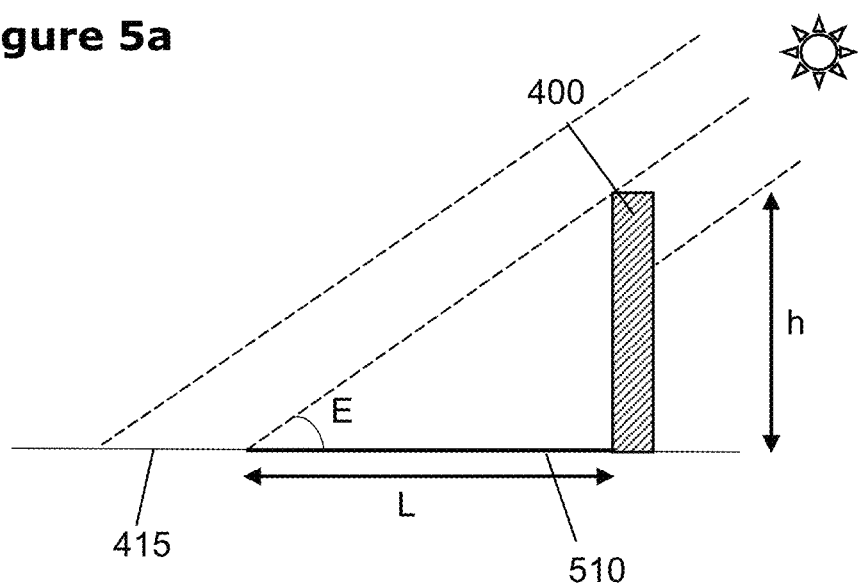
FIG. 5a shows schematically a side perspective of an object illuminated by a light source.

FIG. 5a shows a side perspective of the object 400 on flat ground 415 and illuminated by a light source, as well as a shadow 510 cast by object 400. The object has height h and the light source is elevated by angle E. FIG. 5a is similar to FIG. 4a, other than that the light source is on the right-hand of FIG. 5a, whereas it is on the left-hand side of FIG. 4a. The overhead shadow length L is related to the angle of elevation E of the light source and the height h of the object by $$L = \frac{h}{\tan E},$$

as for the example shown in FIG. 4a.

Figure 5B:
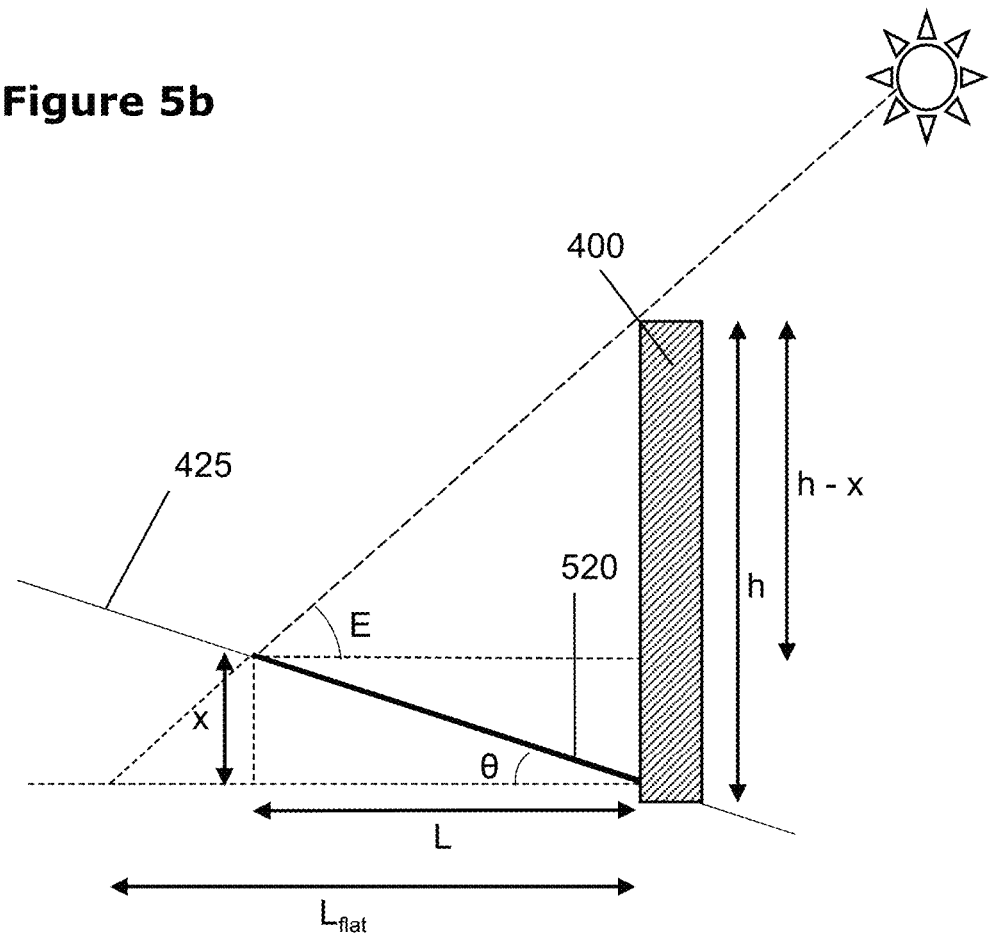
FIG. 5b shows schematically a side perspective of an object illuminated by a light source.

FIG. 5b shows a side perspective of the object 400 on inclined ground 425 and illuminated by the same right-hand side distant light source as FIG. 5a. FIG. 5b also shows a shadow 520 cast by object 400 on the inclined ground 425. Similarly to each of FIGS. 4a-5a, the object has height h and the light source is at an angle of elevation E from flat ground. Similarly to FIG. 4b, the inclined ground 425 is at a slope of θ relative to flat ground and the inclined shadow rises by distance x.

FIG. 5b differs from FIG. 4b in that the inclined ground 425 is inclined to a different side to that in which the light source is elevated. In other words, when both the angle of elevation E of the light source from flat ground and the slope θ of the inclined ground are defined between 0° and 90°, E and θ are measured from flat ground in different senses/directions of rotation. This increases the angle of elevation of the light source from the ground surface on which shadows are cast (i.e. ground 425) to E+θ.

The overhead length L of shadow 520 is indicated by an arrow. Overhead length L is related to the angle of elevation E of the light source from flat ground, the slope θ of the inclined ground relative to flat ground (both E and θ defined between 0° and 90°), the height h of the object, and the rise x of the shadow as follows:

$$\tan\theta = \frac{x}{L} \quad \text{(Equation 3)}$$

$$\tan E = \frac{h-x}{L}$$

$$= \frac{h}{L} - \frac{x}{L}$$

$$= \frac{h}{L} - \tan\theta$$

$$\frac{h}{L} = \tan E + \tan\theta$$

$$L = \frac{h}{\tan E + \tan\theta}$$

This can also be derived from Equation 2, using that tan(180−θ)=−tan(θ). As for Equation 2, when the slope θ of the inclined ground is zero (i.e. for flat ground), this reduces to Equation 1, $$L = \frac{h}{\tan E}.$$

FIG. 5b also shows the length Lflat of the shadow that would be cast if the object were on flat ground (which is the same as length L from FIGS. 4a and 5a). Both the overhead length L and the (longer) ground length of shadow 520 are longer than Lflat. This can also be shown mathematically. In FIG. 5b, both the angle of elevation E of the light source and the slope θ of the inclined ground are between 0° and 90°.

Tan is a positive monotonically increasing function between 0° and 90°, and therefore tan E+tan θ is a positive value that is larger than tan E. Accordingly, $$\frac{h}{\tan E + \tan\theta}$$

is a positive value that is smaller than $$\frac{h}{\tan E},$$

making overhead shadow length L smaller for inclined ground which is inclined to a different side to that in which the light source is elevated than for flat ground.

Of course, both E and θ in FIG. 5b could be measured from flat ground in the same sense/direction of rotation, with one between 0° and 90° and one between 90° and 180°, leading to similar expressions for overhead shadow length L.

In summary, for ground inclined to the same side as the elevation of the light source, shadows are longer than the comparable shadows on flat ground. For ground inclined to the other side as the elevation of the light source, shadows are shorter than the comparable shadows on flat ground.

Shadows may also be cast partially on flat ground and partially on inclined ground, for example when a pedestrian is standing near the bottom or top of a flight of steps. In these cases, the length of the shadow would be between the flat ground shadow length and the shorter/longer inclined ground shadow length.

From Equations 2 and 3, it is clear that shadows cast on more inclined ground (with a higher θ value) will have different lengths to comparable shadows cast on ground that is still inclined but to a lesser extent (smaller θ value). For ground inclined to the same side as the light source elevation (as in FIG. 4b), greater inclines lead to longer shadows than gentler inclines. For ground inclined to a different side as the light source elevation (as in FIG. 5b), greater inclines lead to shorter shadows than gentler inclines.

Identifying Inclined and Non-Inclined Regions from Overhead Images

It is difficult, time-consuming and resource-intensive to obtain accurate and reliable information about inclined geographic regions (e.g. stairs, steep roads, inclined squares), such as by obtaining and analysing light detection and ranging (LIDAR) data, street-level images, or digital elevation map data for geographic regions. Inclined geographic regions cannot be identified from low-resolution or medium-resolution overhead images, because inclined geographic regions do not look noticeable different from non-inclined geographic regions.

The present disclosure uses the shadows visible in overhead images to identify inclined regions. In particular, the present disclosure uses the fact that the length of the shadow cast by an object varies depending on the incline of the ground that the shadow is cast on (all other factors being equal). The difference in lengths between shadows in different regions can therefore be used to identify a difference in inclination/slope between the different regions.

Figure 6A:
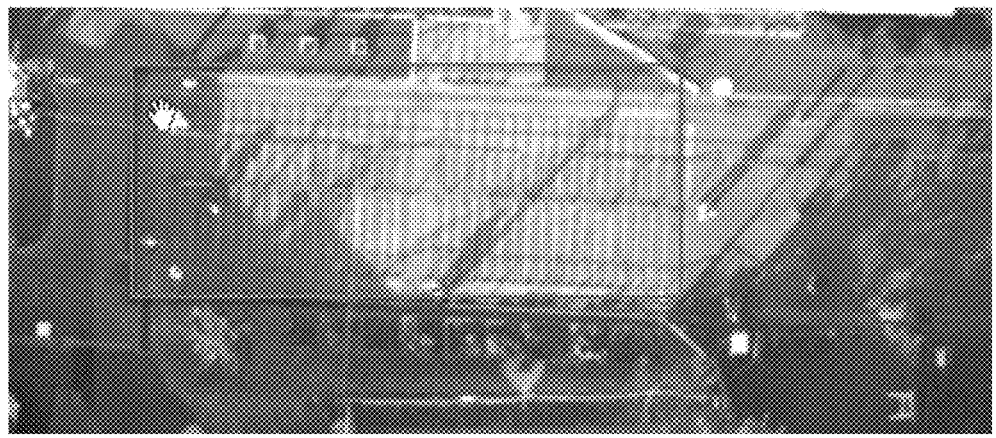
FIG. 6a shows an example of an overhead image of one or more geographic region, according to one embodiment of the present disclosure
Figure 6B:
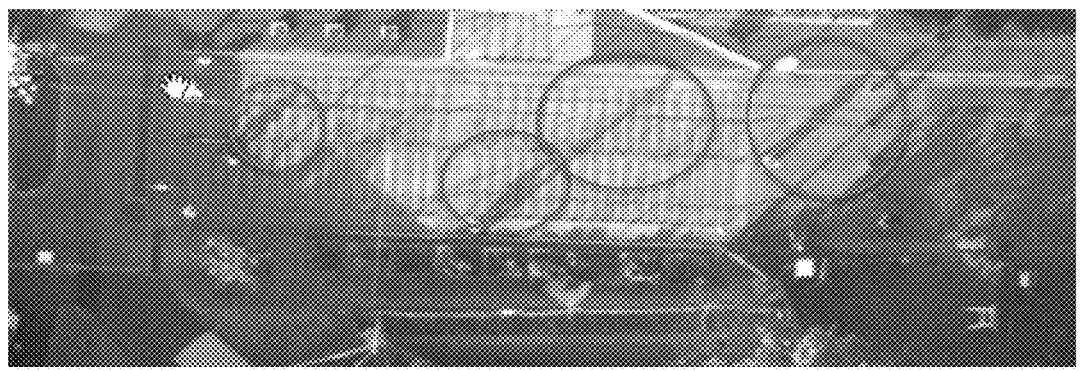
FIG. 6b shows an overhead image of the same geographic regions as FIG. 6a, according to one embodiment of the present disclosure.

FIG. 6a shows an example of an overhead image of one or more geographic regions, with an inclined region highlighted in a red box. FIG. 6b shows an overhead image of the same geographic region. In FIG. 6b, four pedestrian shadows are highlighted in a red ring, three in the inclined geographic region and one outside the inclined geographic region. These shadows may be used to determine that there is a difference in inclination between the geographic region inside the red box and the region outside the red box.

The overhead images of geographic regions, as discussed herein, may be satellite images. The overhead images may be images captured by an unmanned aerial vehicle (e.g. a drone) or a manned aerial vehicle (e.g. a plane).

Figure 7A:
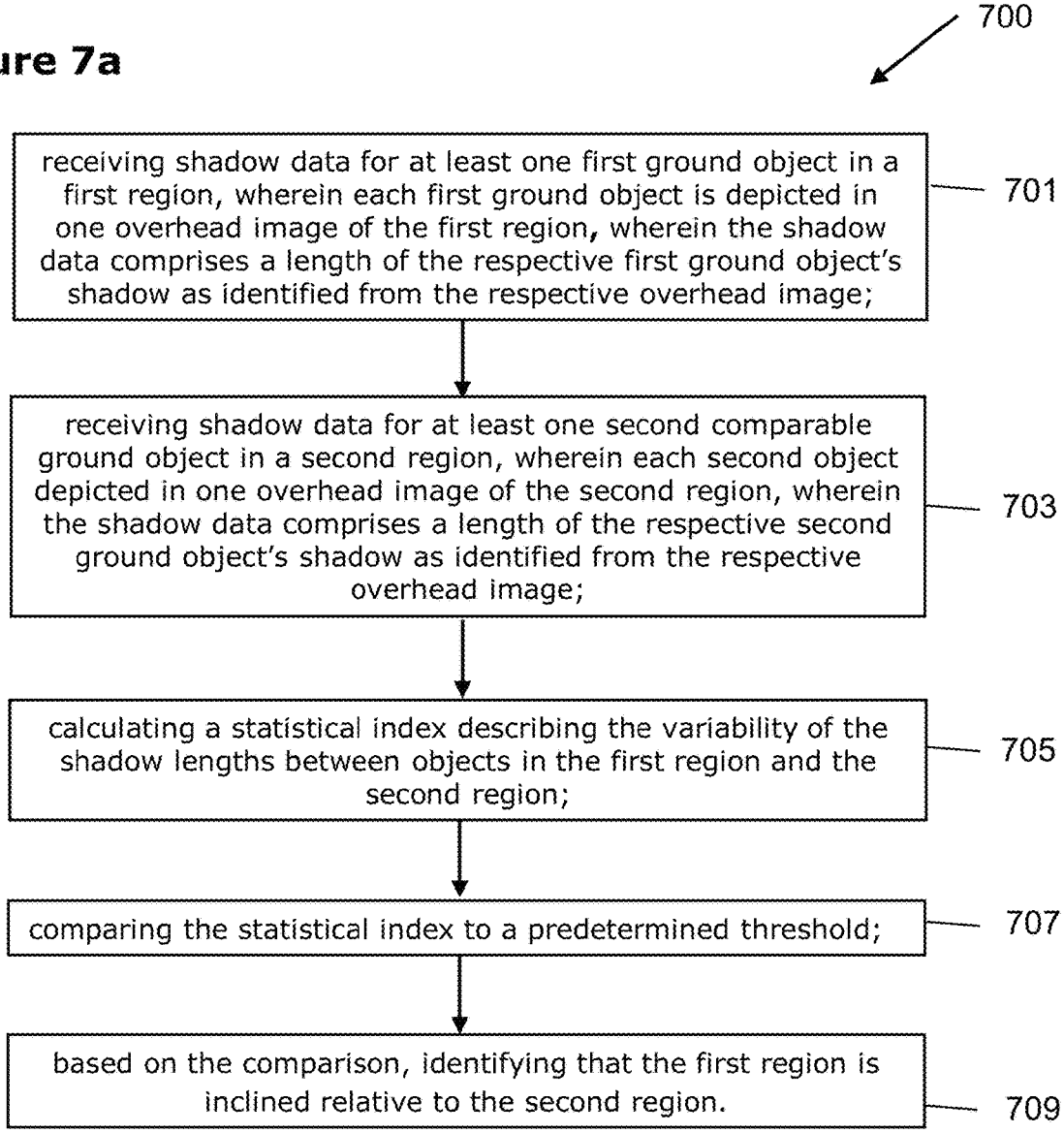
FIG. 7a shows schematically the steps of a method in accordance with some aspects of the present disclosure.

The Method of FIG. 7a

Figure 2:
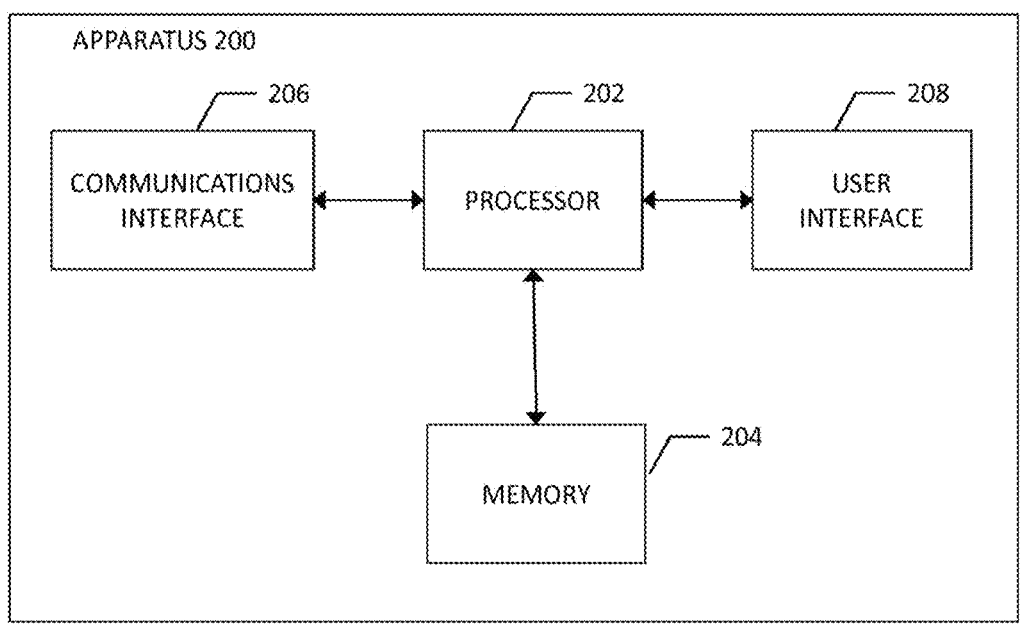
FIG. 2 shows an apparatus according to one embodiment of the present disclosure.

FIG. 7a shows the steps 701-709 of a computer-implemented method 700 in accordance with some aspects of the present disclosure. Method 700 may be performed by various apparatus/entities, including processing server 102 and mobile device 114 as shown in FIG. 1 and apparatus 200 as shown in FIG. 2.

The method 700 comprises: receiving shadow data for at least one first ground object in a first region, wherein each first ground object is depicted in one overhead image of the first region, wherein the shadow data comprises a length of the respective first ground object's shadow as identified from the respective overhead image 701; receiving shadow data for at least one second comparable ground object in the second region, wherein each second object is depicted in one overhead image of the second region, wherein the shadow data comprises a length of the respective second ground object's shadow as identified from the respective overhead image 703; calculating a statistical measure describing the variability of the shadow lengths between objects in the first region and the second region 705; comparing the statistical measure to a predetermined threshold 707; and based on the comparison, identifying that the first region is inclined relative to the second region 709. Method steps 701-709 are discussed further below.

In step 701 of method 700, shadow data for at least one first ground object in the first region is received. In step 703, shadow data for at least one second comparable ground object in the second region is received.

A ground object is an object that is in contact with the ground. The shadow cast by a ground object on the ground begins from, and touches, part of the ground object. Examples of ground objects are a pedestrian and a lamppost. A comparable second ground object may be a ground object of the same object type as the at least one first ground object. In some embodiments, the first and second ground objects may be pedestrians. In some embodiments, the first and second ground objects may be items of street furniture of the same type. Examples of items of street furniture include streetlamps, traffic lights, road signs, telephone booths, mail boxes, street bollards, telephone poles and electricity pylons. All of the ground objects used in a specific embodiment of method 700 are comparable to each other, for example all pedestrians, all lampposts, or all traffic lights.

It will be appreciated that each of the aforementioned types of street furniture has a relatively standardised height. For example, a type of street furniture may be (nationally or locally) legislated to be a particular height or within a particular range of heights. It may be industry practice to make a type of item of street furniture to be a particular height or within a particular range of heights, for example to maximise visibility of the item, useability of the item, manufacturing efficiency or for another reason. Multiple items of a type of street furniture present in the first region and second region respectively may have been manufactured by the same manufacturer (e.g. a local council may order all lampposts for a city from the same manufacturer). Therefore the multiple items may be the same manufacturer-chosen height.

Shadows cast by types of street furniture may have a distinctive shape that is identifiable from an overhead image. For example, electricity pylons have a distinctive shape, and therefore their shadows also have a distinctive shape. Traffic lights have a distinctive shape—a thin pole with a box on top containing the red, yellow and green lights—and therefore their shadows also have a distinctive shape. In some embodiments, the locations of items of a type of street furniture may be known before analysis of the overhead image, and this may be used to identify the shadows cast by these items of street furniture. For example, the locations of all lampposts, mailboxes, telephone booths or street bollards may be known from a map database or from a third party (e.g. a local council or an urban planning company), and these may be used to identify shadows of lampposts, mailboxes, telephone booths and street bollards in overhead images.

Shadows cast by pedestrians may be identified in overhead images using various techniques, for example those described in "Shadow extraction and application in pedestrian detection", Wang et al., EURASIP Journal on Image & Video Processing, 2014.

In some embodiments, there may be only one first ground object and only one second comparable ground object used in the method. In other embodiments, multiple first ground objects and/or multiple second comparable ground objects may be used.

According to step 701, each of the at least one first ground objects is depicted in one overhead image of the first region. In some embodiments, each of the at least one first ground objects may be depicted in a separate overhead image of the first region. In some embodiments, two or more of the first ground objects may be depicted in the same overhead image of the first region. In some embodiments, all of the at least one first ground objects may be depicted in the same one overhead image of the first region.

Similarly, in step 703 each of the at least one second comparable ground objects is depicted in one overhead image of the second region. In some embodiments, each of the at least one second ground objects may be depicted in a separate overhead image of the second region. In some embodiments, two or more of the second ground objects may be depicted in the same overhead image of the second region. In some embodiments, all of the at least one second ground objects may be depicted in the same one overhead image of the second region.

In some embodiments, an overhead image may depict both the first region and the second region. An overhead image may depict both one or more first ground objects and one or more comparable second ground objects. An overhead image may depict all of the at least one first ground objects and all of the at least one second ground objects, i.e. all of the ground objects referred to in steps 701 and 703 may be depicted in the same one overhead image of the first region and second region. In other embodiments, the set of ground objects referred to in steps 701 and 703 may be depicted in two or more overhead images.

Each of the overhead images depicting the first region and/or the second region is temporally-compatible with each other overhead image. Temporally-compatible means that the overhead images were captured at times (and on dates) which allow shadows identified from those images to be compared so as to identify differences in ground inclination using those images. The overhead images must be temporally-compatible to ensure that any difference in shadow length between different images is not due to a significantly different angle of elevation of the Sun.

If only one overhead image is used (i.e. all the ground objects referred to in steps 701 and 703 are depicted in the same image), this image is inherently temporally-compatible with itself. If multiple overhead images are used, their temporal-compatibility can be defined in various ways. Two images captured at substantially the same time (e.g. within a few seconds of each other) are temporally-compatible. Two images captured within a short time threshold of each other (e.g. a few minutes) may be temporally-compatible. Two images captured on different days may also be temporally-compatible, if the two days are close (e.g. consecutive days) and the images were captured at substantially the same time on each day (e.g. 10.00 am on Monday and Tuesday respectively). The time thresholds used to define the temporal-compatibility of two images may be predefined or may be determined experimentally.

In step 701, the received shadow data comprises a length of the respective first ground object's shadow as identified from the respective overhead image that the first ground object is depicted in. Similarly, the shadow data received in step 703 comprises a length of the respective second ground object's shadow as identified from the respective overhead image that the second ground object is depicted in.

The lengths of the first and second ground objects' shadows are overhead lengths (as previously discussed) rather than ground lengths, because these ground object shadow lengths have been identified from overhead images. As discussed above with reference to FIG. 3, in some embodiments a length of a shadow is the longest distance between two points on the edge of the shadow. In some embodiments the length of a shadow is the longest distance in a dominant direction of a shadow.

In some embodiments, the first region and second region may be adjacent geographic regions, i.e. part of the boundary of the first region is also part of the boundary of the second region. In some embodiments, the first and second regions may not be adjacent but may be within a distance threshold of each other. For example, at least part of the first region may be within a distance threshold of at least part of the second region. A characteristic location for the first region (e.g. a centroid of the area) may be within a distance threshold of a characteristic location for the second region. Suitable distance thresholds may be one or more of 10 meters, 50 meters, 100 meters, 500 meters, 1 kilometer, 5 kilometers, 10 kilometers and 50 kilometers. This may be to ensure that the angle of elevation of the Sun is the same for both the first region and second region at the time that the one or more overhead images are captured.

In some embodiments, the first region and the second region may have a maximum size. This may be to increase the proportion of the respective region that has the same inclination. The maximum size may be defined in terms of a maximum area, a maximum distance between two boundary points (a 'maximum length'), or using another method. Suitable maximum lengths may be one or more of 10 meters, 25 meters, 50 meters, 75 meters or 100 meters. Suitable maximum areas may be one or more of 100 square meters, 500 square meter, 1000 square meters, 2500 square meters, 5000 square meters or 7500 square meters.

In some embodiments, the first and second regions in the one or more overhead images may be defined by a user. In some embodiments, the first and second regions may be defined by a computer. In some embodiments, the first and second regions may be defined before the shadow data is received in steps 701 and 703. In some embodiments, the first and second regions may be defined after the shadow data is received in steps 701 and 703.

Figure 6C:
FIG. 6c shows an overhead image of the same geographic regions as FIG. 6a, according to one embodiment of the present disclosure.

A region may be defined to encompass a particular cluster of identified shadows, for example if several shadows are identified close together. A region may be defined to encompass a cluster of shadows with similar lengths. A region may be defined to encompass an area having a similar average pixel colour in the overhead image. A region may be defined to encompass an area having a similar visible pattern in the overhead image. FIG. 6c shows an overhead image of the same geographic area as FIG. 6a, according to one example of the disclosure. In FIG. 6c, two regions are shown as outlined in red line. The region outlined by a rectangle is inclined ground (a flight of steps) and the region outline by a triangle is uninclined ground. These regions may have been defined by considering the respective patterns visible in the overhead image (a striped pattern visible in the rectangle but not the triangle), an average pixel colour for the two regions, or by another method.

In some embodiments, one of the first region and the second region may be a default region whose inclination is known. For example, a town square may be known to be substantially flat ground. Overhead images of other regions may be used with temporally-compatible images of the town square (or other default region whose inclination is known) to identify whether the other regions have a different inclination to the town square (or other default region).

In some embodiments, the shadow data may be internally transmitted by and received at an apparatus performing the method 700, for example an apparatus which also identified the shadows from the overhead images and/or calculated the lengths of the respective shadows. In some embodiments, the shadow data may be transmitted by a separate apparatus (for example a separate apparatus which identified the shadows and/or calculated the shadow lengths) and received by the apparatus performing the method 700.

In step 705, a statistical measure describing the variability of the shadow lengths between objects in the first region and the second region is calculated.

In some embodiments, the statistical measure may comprise one or more of: a difference, a standard deviation, a variance, an interquartile range, and another measure of statistical dispersion. Each of these statistical measures may be an absolute value or a relative value, e.g. an absolute difference or a relative difference. Calculating the statistical measure may involve multiple steps, for example calculating an average shadow length for each of the first and second region, followed by calculating a relative difference between these two average shadow lengths. Various statistical measures are discussed below in relation to particular embodiments of method 700, but it will be appreciated that different statistical measures could also be used with these particular embodiments.

The statistical measure used may depend on the number of first ground objects and/or the number of second ground objects for which shadow data is received. The statistical measure used may depend on the number of overhead images from which the first and second ground objects have been identified. The statistical measure used may depend on the type of ground object (e.g. pedestrian versus lamppost versus street bollard).

In step 707, the statistical measure is compared to a predetermined threshold.

The type and/or value of the predetermined threshold may depend on the type of statistical measure used. The type and/or value of the predetermined threshold may depend on the number of first ground objects and second ground objects for which shadow data is received. The type and/or value of the predetermined threshold may depend on the number of overhead images from which the first and second ground objects have been identified. The type and/or value of the predetermined threshold may depend on the type of ground object (e.g. pedestrian versus lamppost versus street bollard). For example, if the type of ground object is known to have a standardised height, a lower predetermined threshold may be used.

In step 709, the first region is identified as inclined relative to the second region, based on the comparison performed in step 707.

The identification may be made if the statistical measure exceeds the predetermined threshold. The identification may be made if the statistical measure is below the predetermined threshold, depending on how the statistical measure is defined.

The identification may be an identification that at least part of the first region is inclined relative to at least part of the second region. Method 700 may be repeated at least once for smaller regions in order to identify that an entire region is inclined relative to another entire region. For example, the method steps may be repeated for a first subregion of the first region and a second subregion of the second region.

In some embodiments, there may be no identification of whether the first region is more or less inclined that the second region.

In some embodiments, the first region may be identified as being more inclined that the second region. As discussed above, a more inclined region can give rise to longer or shorter shadows than a less inclined region, depending on the relative positions of the light source and the incline direction. Therefore additional information is required to identify the first region as more inclined that the second region. In some embodiments, the additional information could comprise one or more of: the inclination of one of the first region and the second region, the time of day that the one or more overhead images were captured, the direction of the Sun relative to the first and second regions, the elevation of the Sun relative to the first and second regions, and the length of shadow cast by a ground object of average height on flat ground at the time the overhead images were captured.

In some embodiments, the first region may be identified as being less inclined that the second region. As discussed above, additional information is required to identify the first region as less inclined that the second region In some embodiments, multiple statistical measures may be calculated and compared to multiple predetermined thresholds. The identification in step 709 may be based on the multiple comparisons.

Specific embodiments of method 700 are discussed further below. The method 700 provides a simple, efficient way of identifying and distinguishing inclined regions, using the fact that shadows cast on ground of a particular inclination are different in length to shadows cast on less-inclined ground or more-inclined ground (all other factors being the same).

Figure 7B:
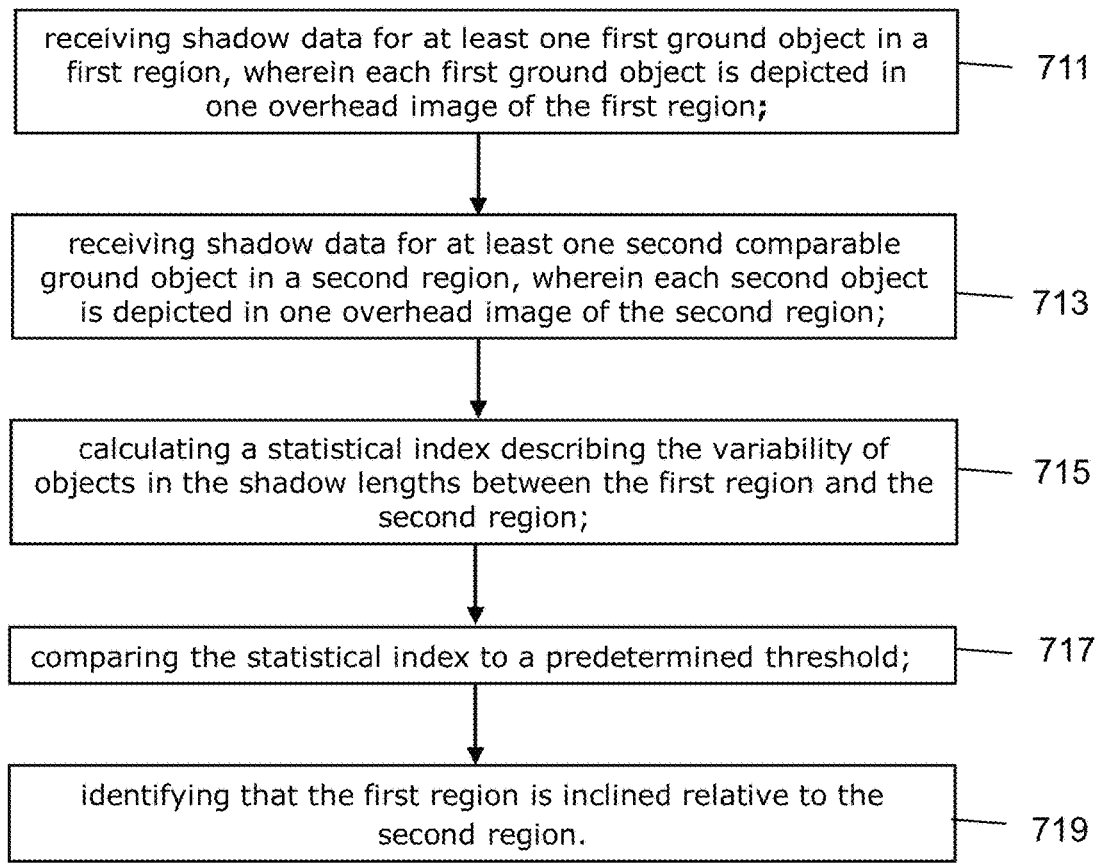
FIG. 7b shows schematically the steps of a method in accordance with some aspects of the present disclosure.

The Method of FIG. 7b

FIG. 7b shows the steps 711-719 of a computer-implemented method 710 in accordance with some aspects of the present disclosure. Method 710 may be performed by various apparatus/entities, including processing server 102 and mobile device 114 as shown in FIG. 1 and apparatus 200 as shown in FIG. 2.

The method 710 comprises: receiving shadow data for at least one first ground object in the first region, wherein each first ground object is depicted in one overhead image of the first region 701; receiving shadow data for at least one second comparable ground object in the second region, wherein each second object is depicted in one overhead image of the second region 703; calculating a statistical measure describing the variability of the shadow lengths between objects in the first region and the second region 705; comparing the statistical measure to a predetermined threshold 707; and identifying that the first region is inclined relative to the second region 709.

One or Multiple Pedestrians Tracked Between Multiple Images

In some embodiments of method 700 or method 710, the at least one first ground object comprises a first pedestrian depicted in a first overhead image of the first region, and the at least one second comparable ground object comprises the same first pedestrian depicted in a second overhead image of the second region. In other words, the pedestrian is present in one of the first and second regions in one overhead image, and is tracked as having moved to the other region in a different, later-captured overhead image. The pedestrian is tracked moving between the first region and second region, which encompasses moving from the first region to the second region and moving from the second region to the first region.

Figure 8:
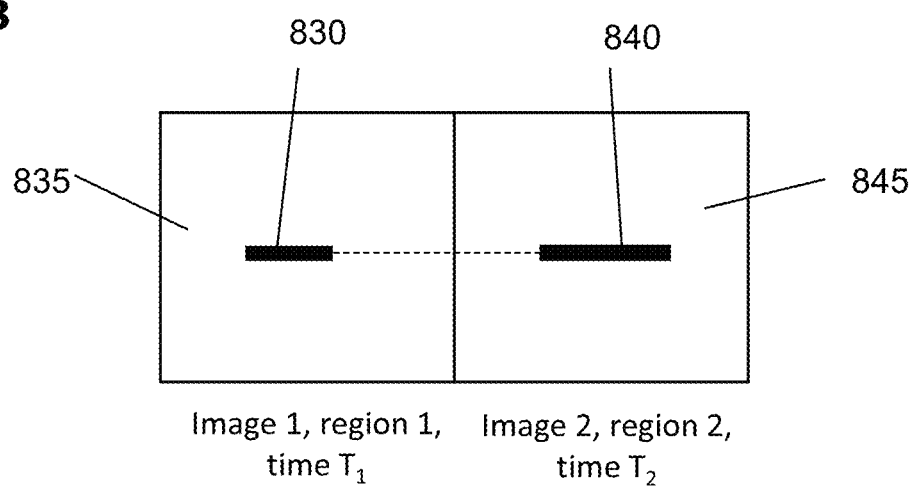
FIG. 8 shows schematically two overhead images depicting a first region and second region respectively, according to one embodiment of the present disclosure.

This is shown diagrammatically in FIG. 8. FIG. 8 shows two overhead images 835, 845 depicting a first region and second region respectively, taken at times T1 and T2 respectively, according to one embodiment of the disclosure. One pedestrian shadow 830, 840 is shown in each region, joined by a dotted line to indicate that the pedestrian is tracked moving between the two regions.

The first and second overhead images are different images captured a short time period apart on the same day. Suitable short time periods may be one or more of 5 seconds, 10 seconds, 15 seconds, 20 seconds, 30 seconds, 45 seconds, 60 seconds, 90 seconds, and 2 minutes. The length of a suitable short time period may depend on factors such as the sizes of the first region and second region (e.g. areas, maximum lengths), a country or city that the regions are located in, an average walking speed associated with the regions (e.g. associated with the city or country that the regions are located in), the time of day at which the images are captured, the day of the year on which the images are captured, a rate of change of Sun elevation at the time and day at which the images are captured.

The predetermined threshold used may vary depending on the length of the short time period. For example, if the only two images available of the pedestrian in the two regions are 10 minutes apart, then 10 minutes may be considered to be a short time but the calculated statistical measure may need to pass a more stringent threshold in order for the first region to be identified as inclined relative to the second region.

A suitable time period and a suitable predetermined threshold can be determined experimentally by performing trials to try to maximise the number of first regions correctly identified as inclined relative to second regions, whilst minimising the number of false positives.

The pedestrian may be tracked between overhead images of the first and second regions by various methods. For example, the pedestrian may be identified and tracked using street-level video footage (e.g. CCTV footage) or street-level images. The particular shape of the pedestrian's shadow may be identified in the two overhead images. The pedestrian's shadow may be the only pedestrian shadow identified in the vicinity of the two geographic regions. The speed and direction of the pedestrian's movement may be identified from two or more overhead images of one region and/or from street-level images/videos, and used to predict when the pedestrian will be present in the other region.

Various statistical measures describing the variability of the shadow lengths between objects in the first region and the second region may be calculated. In some embodiments, the calculated statistical measure comprises a difference between the shadow length of the first pedestrian as identified from the first overhead image of the first region and the shadow length of the first pedestrian as identified from the second overhead image of the second region. This difference may be an absolute difference (e.g. the difference between a 3 meter shadow and a 4 meter shadow is 1 meter). This difference may be a relative difference (e.g. the difference between 3 and 4 meter shadows is either 25% or 33.3%). These calculated differences can then be compared to an absolute difference predetermined threshold (e.g. 25 cm, 50 cm, 75 cm, 1 meter, 1.5 meters or 2 meters) or a relative difference predetermined threshold (e.g. 5%, 10%, 15%, 20%, 25% or 30%), as appropriate.

In some embodiments, the at least one first ground object and at least one second ground object may comprise only of a single pedestrian who is tracked moving between the first and second regions in two overhead images taken a short time period apart. Equations 1, 2 and 3 above show that the length L of a shadow depends only the height h of the object casting the shadow, the elevation E of the light source from flat ground, and the slope θ of the ground on which the shadow is cast. For these embodiments, the value of h is constant (same pedestrian) and the value of E is near-constant (images captured at approximately same position and same time). Thus the length L of shadow cast by the single pedestrian varies solely due to differences in the slope θ of the ground on which the shadow is cast. This allows relatively small changes in the shadow length of the pedestrian (e.g. a 5%, 10% or 15% relative difference) to be used to determine a difference in inclinations between the first region and second region.

In some embodiments, the at least one first ground object and at least one second ground object may comprise multiple pedestrians who have been tracked moving between the first and second regions. Absolute or relative differences in shadow lengths can be calculated for each pedestrian's shadow pair. The multiple differences may be individually compared to an appropriate predetermined threshold. The multiple differences may be averaged and then compared to an appropriate predetermined threshold. Alternatively, an average or a summed shadow length may be determined for the multiple shadows in the first region, and similarly for the second region. An absolute or relative difference may be calculated between the average/summed shadow lengths for the first and second regions respectively, and this difference may be compared to an appropriate predetermined threshold. The predetermined threshold may vary depending on the number of the multiple pedestrians. Similarly to the single-pedestrian embodiment in the previous paragraph, for each of the multiple pedestrians, the length L of their shadow varies solely based on the slope θ of the ground on which the shadow is cast. Thus relatively small changes in the shadow length of the multiple pedestrians (e.g. a 5%, 10% or 15% relative difference) can be used to determine a difference in inclinations between the first region and second region.

Multiple Different Objects Depicted in One Image

In some embodiments of method 700 or method 710, all of the at least one first ground object and at least one second comparable ground object are depicted in the same one overhead image of the first region and the second region.

This one image is inherently temporally-compatible with itself. In some embodiments, the ground objects may be items of a particular type of street furniture. In other embodiments, the ground objects may be pedestrians.

Figure 9:
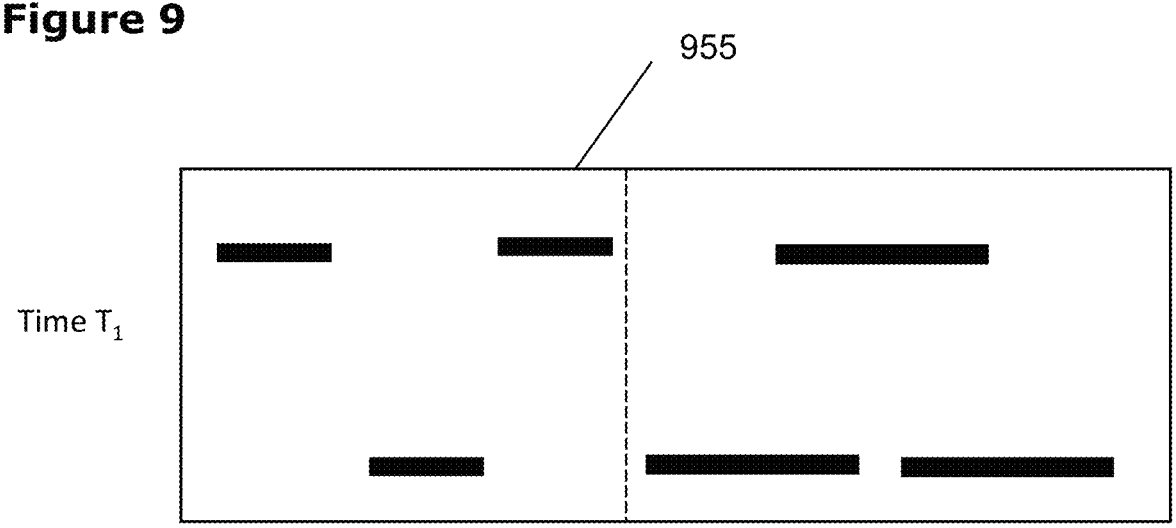
FIG. 9 shows schematically one overhead image depicting a first region and second region respectively, according to one embodiment of the present disclosure.

One such embodiment is shown diagrammatically in FIG. 9. FIG. 9 shows one overhead image 955 depicting both a first region and second region (a dotted line shows a boundary between the first and second regions), captured at time T1. Six ground object shadows are shown, three in each region. Table 1 shows the shadow lengths for the six ground object shadows of FIG. 9, according to one example. In one embodiment, these six shadows are cast by six pedestrians. In another embodiment, these six shadows are cast by six lampposts lining a road, or six items of another type of street furniture.

TABLE 1

| Shadow lengths in first region (meters) | Shadow lengths in second region (meters) |
| --- | --- |
| 4.0 | 6.6 |
| 4.1 | 6.7 |
| 4.2 | 6.8 |

Various statistical measures describing the variability of shadow lengths between ground objects in the first region and second region may be calculated and used to identify a difference in inclinations between the first and second regions. For example, a difference between the average shadow length in the first region (4.1 meters) and the average shadow length in the second region (6.7 meters) may be calculated. The difference may be an absolute difference (2.6 metres) or a relative difference (63% or 39%, depending on which region's average length is used as the denominator). This difference can be compared to an appropriate predetermined threshold.

Additionally or alternatively, an absolute standard deviation of the six shadow lengths may be calculated (as 1.3 meters). This may be compared to an absolute standard deviation predetermined threshold. A relative standard deviation may be calculated by dividing the absolute standard deviation (1.3 meters) by the average of the 6 shadow lengths (5.4 meters). This gives a relative standard deviation of 0.24, which can be compared to a relative standard deviation predetermined threshold. It will be appreciated that the six shadow lengths having a standard deviation above a threshold may not necessarily indicate that the two regions have different inclinations. For example, the same standard deviation (1.3 meters) would be calculated for a first region having shadow lengths 4.0 m, 4.2 m and 6.7 m and a second region having shadow lengths 4.1 m, 6.6 m and 6.8 m. Further steps may be required to confirm that the standard deviation exceeding the threshold is due to a difference in inclinations between regions.

Alternatively, a different relative standard deviation may be calculated by dividing the absolute standard deviation (1.3 meters) by the average of the shadow lengths in the first region (4.1 meters) and/or second region (6.7 meters). This gives relative standard deviations of 0.32 and 0.19 respectively, which can be compared to appropriate predetermined thresholds.

Different types of statistical measure could be calculated, for example, a variance or interquartile range. In some embodiments, multiple statistical measures could be calculated and compared to respective predetermined thresholds, and the identification of the first region as inclined relative to the second could be based on the multiple comparisons.

In embodiments where the multiple ground objects in the one overhead image are all pedestrians, it will be appreciated that each of the multiple pedestrians is a different pedestrian. Thus, each pedestrian may have a different height, and each pedestrian shadow may be cast by an object/pedestrian of a different height. This natural variation of pedestrian heights may be larger than the variation in heights of a particular type of street furniture (e.g. lampposts), leading to a larger natural variability in pedestrian shadow lengths than street furniture shadow lengths, even on ground which is all at the same inclination. Higher predetermined thresholds may be used for pedestrian-ground objects than street furniture-ground objects to account for the increased natural height variability and to reduce the likelihood of a false positive identification of the first region as inclined relative to the second region.

Multiple Different Objects Depicted in Multiple Images

In some embodiments of method 700 or method 710, the at least one first ground object and at least one second comparable ground object are depicted in two or more overhead images of the first region and/or the second region. In some embodiments (such as that shown in FIG. 10), all of the first ground objects may be depicted in a first overhead image of the first region, and all of the second ground objects may be depicted in a different second overhead image of the second region. In some embodiments (such as that shown in FIG. 11), all of the first ground objects may be depicted in two or more overhead images of the first region, and all of the second ground objects may be depicted in two or more overhead images of the second region (which may or may not be the same as the two or more overhead images of the first region).

Figure 10:
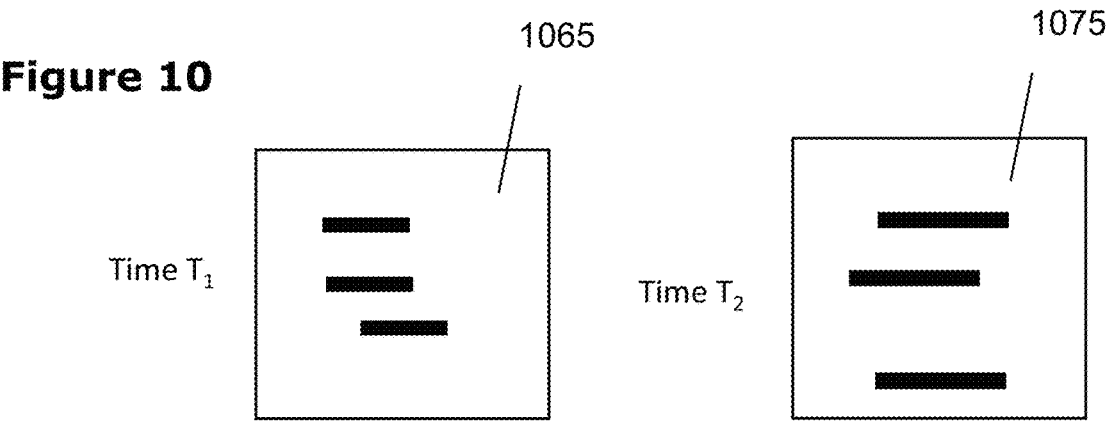
FIG. 10 shows schematically two overhead images depicting a first region and second region respectively, according to one embodiment of the present disclosure.

FIG. 10 shows diagrammatically two overhead images of geographic regions. Overhead image 1065 depicts the first region and is captured at time T1. Three shadows cast by ground objects are depicted in the first region in overhead image 1065. Overhead image 1075 depicts the second region and is captured at time T2 (which may be same as T1). Three shadows cast by ground objects are depicted in the second region in overhead image 1075. The shadow lengths of the six shadows may be the same as those given in Table 1 above. The various types of statistical measure discussed above in relation to the embodiment of FIG. 9 (in which all of the at least one first ground object and at least one second comparable ground object are depicted in the same one overhead image) can also be used for the embodiment of FIG. 10.

Figure 11:
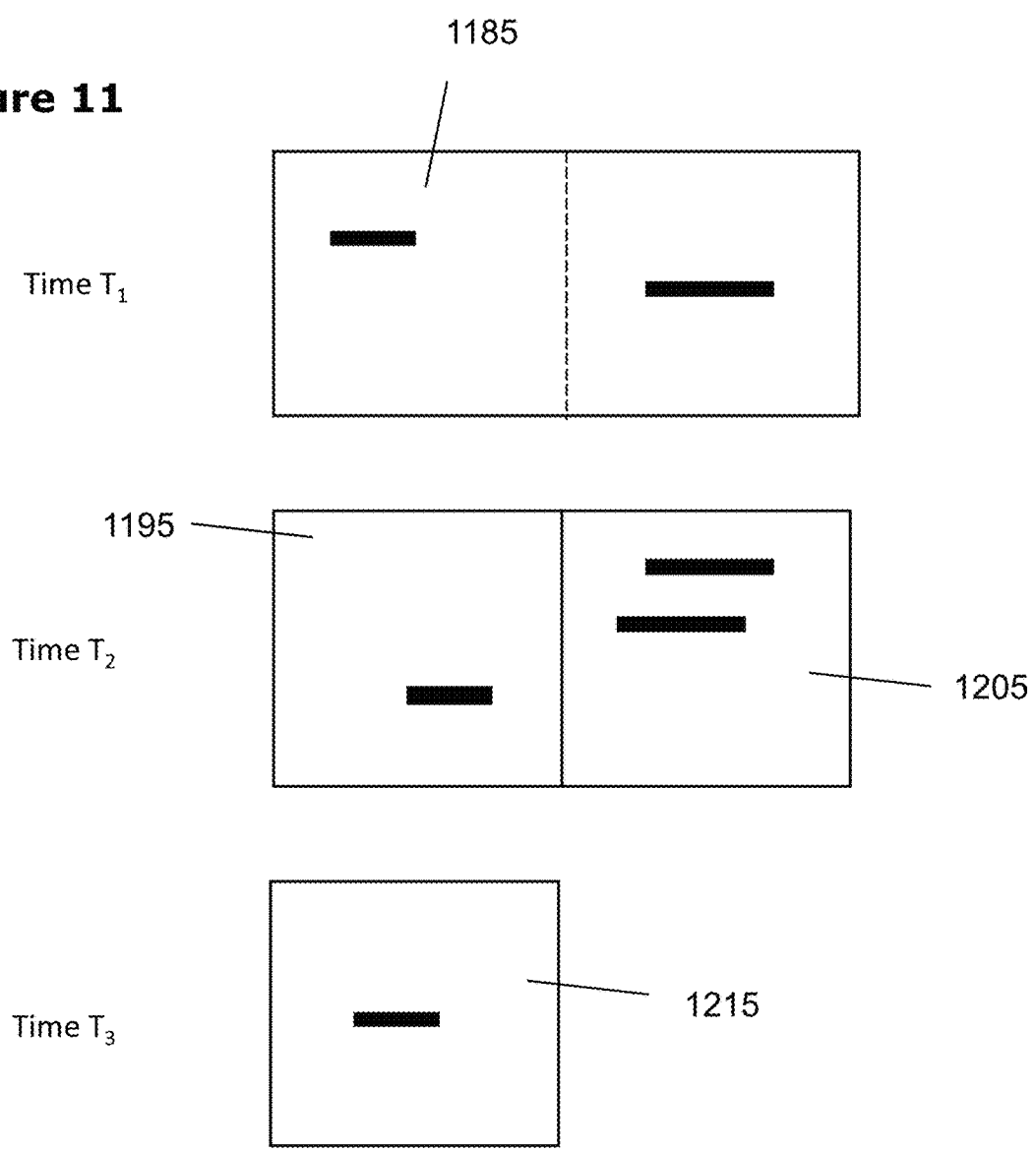
FIG. 11 shows schematically four overhead images depicting a first region and/or a second region respectively, according to one embodiment of the present disclosure.

FIG. 11 shows diagrammatically four overhead images of geographic regions. The first overhead image 1185 depicts both the first and second regions, is captured at time T1, and depicts one shadow cast by a ground object in the first region and one in the second region. The second overhead image 1195 depicts the first region and one shadow therein. The third overhead image 1205 depicts the second region and two shadows therein. Both the second and third overhead images are captured at time T2. The fourth overhead image 1215 depicts the first region and one shadow therein, and is captured at time T3. In total, three shadows cast by ground objects are depicted in the first region, across three overhead images. Three shadows cast by ground objects are depicted in the second region, across two overhead images. The shadow lengths of the six shadows may be the same as those given in Table 1 above. The various types of statistical measure discussed above in relation to the embodiment of FIG. 9 (in which all of the at least one first ground object and at least one second comparable ground object are depicted in the same one overhead image) can also be used for the embodiment of FIG. 11.

Other Method Steps

Various other method steps may optionally be performed according to some embodiments of the present disclosure. It will be appreciated that whilst it may be necessary for several of the steps disclosed below to have been performed prior to the steps 701-709 of method 700 and steps 711-719 of method 710, the actual performance of these steps is not required by the present disclosure.

Optionally, the shadow of each ground object may be identified from its respective overhead image. Shadows cast by pedestrians may be identified in overhead images using various techniques, for example those described in "Shadow extraction and application in pedestrian detection", Wang et al., EURASIP Journal on Image & Video Processing, 2014. Shadows cast by types of street furniture may have a distinctive shape that is identifiable from an overhead image. The locations of items of a particular type of street furniture (e.g. lampposts, street bollards, mailboxes) may be known (e.g. from a local council or urban planning company) and used to identify shadows cast by these items of street furniture.

Optionally, the respective lengths of each of the ground objects' shadows may be determined. The length of a ground object's shadow may be the longest distance between two points on the edge of the shadow. The length of a ground object's shadow may be the longest distance in a dominant direction of a shadow. A dominant direction of a shadow may be determined from analysis of one or multiple shadows, by considering the location of the Sun relative to the location of the ground object, or by another method. In some embodiments, the length of a ground object's shadow may be determined by analysing the overhead image that the shadow is identified in. Alternatively or additionally, a street level image captured at the same time may be analysed. A known scale of the (overhead or street level) image may be used (e.g. 1:40). Other sources may be used, for example information about the dimensions of one or multiple objects around the ground object that are visible in the overhead or street level image. For example, the real-world length of a building that is visible in the image may be known from a map database and may be combined with the in-image lengths of the building and the shadow to obtain the real-world length of the shadow. The real-world dimensions of multiple other objects (e.g. multiple buildings) may be used in combination with the image to identify the length of the ground object's shadow.

Optionally, the first region and the second region may be defined before receiving the shadow data for the at least one first ground object and at least one comparable second ground object. The first region and second region may be defined after receiving the shadow data for the at least one first ground object and at least one comparable second ground object. As discussed previously, a region may be defined to encompass a particular cluster of identified shadows, to encompass a cluster of shadows with similar lengths, to encompass an area having a similar average pixel colour in the overhead image, to encompass an area having a similar visible pattern in the overhead image, or using other criteria.

Optionally, method 700 may be repeated at least once for smaller regions in order to identify that an entire region is inclined relative to another entire region, rather than just part of the first region and/or part of the second region. The method steps may be repeated for a first subregion of the first region and a second subregion of the second region.

Optionally, it may be determined whether the first region is more inclined or less inclined than the second region. Various types of additional information may be used in this determination. For example, the additional information could comprise one or more of: the inclination of one of the first region and the second region, the time of day that the one or more overhead images were captured, the direction of the Sun relative to the first and second regions, the elevation of the Sun relative to the first and second regions, and the length of shadow cast by a ground object of average height on flat ground at the time the overhead images were captured. For example, if the Sun is known to be to the west of the first and second regions, it can be determined than objects in the region with the larger slope in a westerly direction (or equivalently a smaller slope in an easterly direction) will cast longer shadows (all other factors being equal). This can be understood from FIGS. 4a and 4b, taking the left of the page to be West.

Optionally, a geographic database may be updated to indicate that the first region is inclined relative to the second region. The geographic database may be updated to indicate that the first region is more or less inclined than the second region.

Apparatus Performing the Methods Herein

FIGS. 1 and 2 show a system and apparatus respectively which may, in some embodiments, perform methods described herein (including but not limited to methods 700 and 710). FIG. 1 shows a map developer system; however, the methods disclosed herein could be performed by various other entities, for example a governmental agency or an urban planning company may be interested in identifying the locations of inclined regions.

In some embodiments, a system comprising multiple apparatus could perform the methods disclosed herein, with different steps of the methods being performed by different apparatus. For example, one apparatus could receive the two sets of shadow data and calculate the statistical measure, and send the calculated statistical measure to a second apparatus. The second apparatus could compare the received statistical measure to a predetermined threshold and identify the first region as inclined relative to the second region. Different apparatuses could perform steps such as identifying the shadow of each ground object from its respective overhead image, and determining the respective lengths of each of the ground objects' shadows.

FIG. 1 shows a system including a map developer system 116, comprising a map database 108 and a processing server 102, in communication with one or more mobile devices 114 via a network 112. The network may be wired, wireless, or any combination of wired and wireless communication networks, such as cellular, Wi-Fi, internet, local area networks, or the like. Additional, different, or fewer components may be provided. For example, the map developer system 116 may be in communication with many mobile devices 114 via the network 112.

The mobile device 114 may include a portable computing device such as a laptop computer, tablet computer, mobile phone, smart phone, portable navigation device, personal data assistant (PDA), wearable electronic device, camera, portable navigation device, or the like. Additionally or alternatively, the user equipment 104 may be a fixed computing device, such as a personal computer, computer workstation, kiosk, office terminal computer or system, or the like.

The processing server 102 may be one or more fixed or mobile computing devices. The mobile device 114 may be configured to access the map database 108 via network 112 and via the processing server 102 through, for example, a mapping application, such that the mobile device 114 may provide navigational assistance to a user through access to the map developer system 116.

The map database 108 may include road segment data records (or equivalently 'link data'), node data records, and/or point of interest (POI) data records. The road segment data records may be segments or links representing roads, streets, or paths. The node data records may represent intersections between roads, streets or paths. In some embodiments, the road link data and the node data may represent a road network, such as used by vehicles, cars, trucks, buses, motorcycles, bicycles and/or other entities. The map database 108 may also include cartographic data, routing data, maneuvering data and/or other types of data.

The map database 108 may include records or data about geographic regions that are not roads, streets, paths or intersections, such as squares, parks and civic centers. The map database 108 may include information about whether a geographic region (such as a road, street, path, square, plaza, park, civic centre) is inclined. The map database 108 may included information about whether a geographic region is inclined relative to another geographic region. The map database 108 may include information about the degree of inclination, for example a category label (e.g. low, medium or high inclination), a range (e.g. 0°-10°, 10°-20°, 20°-30°) or a number (e.g. 13°).

The map database 108 may be maintained by a content provider e.g., a map developer. In some embodiments, the map developer may collect geographic data to generate and enhance the map database 108, whereas in other embodiments, the map database 108 may delegate map generation and revision to other devices, such as mobile device 114. The map developer can use different ways to collect data. One such way includes obtaining data from other sources, such as municipality authorities. Another way is for the map developer to employ field personnel to travel by vehicle along roads throughout the geographic region to observe features and/or record information about them. Another way is using remote sensing, such as aerial or satellite photography, to generate map geometries directly or through machine learning. As discussed extensively above, aerial or satellite images can be used to identify inclined regions for inclusion in the map database 108.

FIG. 2 shows one embodiment of an apparatus 200 which may be configured to perform methods described herein. The apparatus 200 includes or is otherwise in communication with a processor 202, a memory device 204, a communication interface 206, and a user interface 208. In this example only one processor 202 and one memory device 204 are shown but it will be appreciated that other examples may utilise more than one processor and/or more than one memory devices (e.g. same or different processor/memory types).

In some embodiments, apparatus 200 may be an example of processing server 102 as shown in FIG. 1. In some embodiments, apparatus 200 may be an example of mobile device 114 as shown in FIG. 1. In other embodiments, apparatus 200 may be a module for a device or circuitry for a device (e.g. processing server 102 or mobile device 114).

The processor 202 (and/or co-processors or any other processing circuitry assisting or otherwise associated with the processor) is in communication with the memory device 204 via a bus for passing information among components of the apparatus 200. The internal connections between the memory device 204 and the processor 202 can be understood to provide active coupling between the processor 202 and the memory device 204 to allow the processor 202 to access computer program code stored on the memory device 204.

The memory device 204 may be non-transitory and may include, for example, one or more volatile and/or non-volatile memories. In other words, for example, the memory device 204 may be an electronic storage device (e.g. a computer-readable storage medium) comprising gates configured to store data (for example, bits) that may be retrievable by a machine (e.g. a computing device like the processor 202). The memory device 204 may be solid-state memory, a hard disk drive (HDD), read-only memory (ROM), random-access memory (ROM), flash memory or another type of memory. The memory device 204 may be configured to store information, data, content, applications, instructions or the like executable by processor 202 for enabling the apparatus to carry out various functions in accordance with an example embodiment of the present disclosure. For example, the memory device 204 could be configured to buffer input data for processing by the processor 202. Additionally or alternatively, the memory device 204 could be configured to store instructions for execution by the processor 202. For example, memory device 204 may be configured to store computer program instructions which, when executed by processor 202, cause apparatus 200 to perform a method as described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an application specific integrated circuit (ASIC), a field programmable gate array (FGPA), a microcontroller unit (MCU), a hardware accelerator, a special-purpose computer chip, or the like. As such, in some embodiments, the processor may include one or more processing cores (of the same or different types) configured to perform independently. A multi-core processor may enable multiprocessing within a single physical package. Additionally or alternatively, the processor 202 may include one or more processors configured in tandem via the bus to enable independent execution of instructions, pipelining and/or multithreading.

In some embodiments, the processor 202 may be configured to execute instructions stored in the memory device 204 or otherwise accessible to the processor 202. Alternatively or additionally, the processor 202 may be configured to execute hard coded functionality. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device)

configured to employ an embodiment of the present disclosure by further configuration of the processor by instructions for performing the algorithms and/or operations described herein. The processor 202 may include, among other things, a clock, an arithmetic logic unit (ALU) and logic gates configured to support operation of the processor.

The apparatus 200 may also include a communication interface 206. Communication interface 206 may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include an optional user interface 208 that maybe in communication with the processor 202 to provide output to the user and, in some embodiments, to receive an indication of a user input. As such, the user interface 208 may include a display and, in some embodiments, may also include a keyboard, a mouse, a joystick, a touch screen, touch areas, soft keys, one or more microphones, a plurality of speakers, or other input/output mechanisms. In one embodiment, the processor 202 may comprise user interface circuitry configured to control at least some functions of one or more user interface elements such as a display and, in some embodiments, a plurality of speakers, a ringer, one or more microphones and/or the like. The processor 202 and/or user interface circuitry comprising the processor may be configured to control one or more functions of one or more user interface elements through computer program instructions (for example, software and/or firmware) stored on a memory accessible to the processor 202 (for example, memory device 204, and/or the like). The processor 202 may receive data via the user interface 208 and/or the communications interface 206 and memory device 204 may be configured to store data received via the user interface 208 and/or the communication interface 206.

Figure 12:
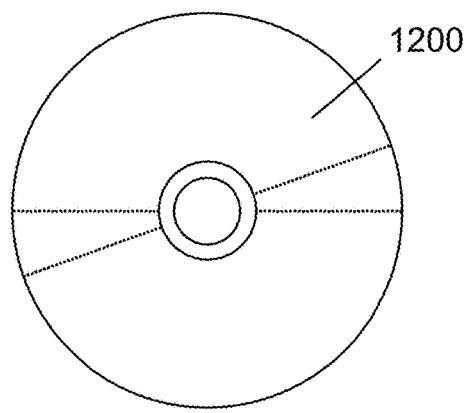
FIG. 12 shows schematically an example computer-readable medium comprising a computer program configured to perform, control or enable the method of FIG. 7a or FIG. 7b.

FIG. 12 shows an example computer-readable medium 1200 comprising a computer program configured to perform, control or enable the method of FIG. 7a, the method of FIG. 7b or any other method described herein. The computer program may comprise computer code configured to perform the method(s). In this example, the computer/processor readable medium 1200 is a disc such as a digital versatile disc (DVD) or a compact disc (CD). In other examples, the computer/processor readable medium 1200 may be any medium that has been programmed in such a way as to carry out an inventive function. The computer/processor readable medium 1200 may be a removable memory device such as a memory stick or memory card (SD, mini SD, micro SD or nano SD card). In some embodiments, the computer-readable medium 1200 may be non-transitory.

It will be appreciated to the skilled reader that any mentioned apparatus/device and/or other features of particular mentioned apparatus/device may be provided by apparatus arranged such that they become configured to carry out the desired operations when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality Such examples can allow a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

It will be appreciated that the term "circuitry" may refer to one or more or all of the following: (a) hardware-only circuit implementations (such as implementations in only analogue and/or digital circuitry) and (b) combinations of hardware circuits and software, such as (as applicable): (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in the claims. As a further example, as used in this application the term circuitry also covers and implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although the foregoing description and the associated drawings describe example embodiments including certain example combinations of features, it should be appreciated that different combinations of features may be provided by alternative embodiments without departing from the scope of the appended claims. In this regard, the applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims.

In view of the foregoing description it will be evident to a person skilled in the art that various modifications may be made within the scope of the disclosure. Therefore, it is to be understood that the disclosure is not to be limited to the specific embodiments described above and that modifications and other embodiments are intended to be included within the scope of the appended claims. It will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or example may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A computer-implemented method for identifying region incline from at least one temporally-compatible overhead image, the method comprising:
   receiving shadow data for at least one first ground object in a first region, wherein each first ground object is depicted in one overhead image of the first region, wherein the shadow data comprises a length of the respective first ground object as identified from the respective overhead image;
   receiving shadow data for at least one second comparable ground object in a second region, wherein each second ground object is depicted in one overhead image of the second region, wherein the shadow data comprises a length of the respective second ground object as identified from the respective overhead image;
   calculating a statistical measure describing the variability of the shadow lengths between objects in the first region and the second region;
   comparing the statistical measure to a predetermined threshold; and
   based on the comparison, identifying that the first region is inclined relative to the_second region.

2. The method of claim 1, wherein the first and second ground objects are pedestrians.

3. The method of claim 1, wherein the first and second ground objects are items of street furniture of the same type.

4. The method of claim 3, wherein the first and second ground objects are one of:
   streetlamps, traffic lights, road signs, telephone booths, mail boxes, street bollards, telephone poles and electricity pylons.

5. The method of claim 1, wherein the statistical measure describing the variability of the shadow lengths between objects in the first region and the second region comprises one or more of: a difference, a standard deviation, a variance, and an interquartile range.

6. The method of claim 1, wherein the type of statistical measure calculated depends on one or more of:
   the number of the at least one first ground objects and/or the number of the at least one second ground objects for which shadow data is received;
   the number of overhead images from which the at least one first ground object and at least one second ground objects have been identified; and
   the type of ground object.

7. The method of claim 1, wherein the type and/or value of the predetermined threshold depends on one or more of:
   the number of the at least one first ground objects and/or the number of the at least one second ground objects for which shadow data is received;
   the number of overhead images from which the at least one first ground object and at least one second ground objects have been identified; and
   the type of ground object.

8. The method of claim 1, wherein the at least one overhead image comprises at least one satellite image, at least one image captured by an unmanned aerial vehicle, or at least one image captured by a manned aerial vehicle.

9. The method of claim 1, wherein the at least one temporally-compatible overhead image comprises one of:
   a single image;
   two images captured on the same day at substantially the same time;
   two images captured on the same day within a short time threshold; and
   two images captured on consecutive days at substantially the same time.

10. The method of claim 1, wherein the first region is within a distance threshold of the second region.

11. The method of claim 1, wherein one of the first region and the second region is a default region for which an inclination is known.

12. The method of claim 1, wherein:
   the at least one first ground object comprises a first pedestrian depicted in a first overhead image of the first region,
   the at least one second comparable ground object comprises the same first pedestrian depicted in a second overhead image of the second region, the first overhead image and the second overhead image are captured a short time period apart on the same day, and the first pedestrian is tracked moving between the first region as depicted in the first overhead image and the second region as depicted in the second overhead image.

13. The method of claim 1, wherein all of the at least one first ground object and at least one comparable second ground object are depicted in the same one overhead image.

14. The method of claim 1, further comprising updating a geographic database to indicate that the first region is inclined relative to the second region.

15. The method of claim 1, further comprising: identifying that the first region is more inclined than the second region, based on the comparison and at least one piece of additional information.

16. The method of claim 1, wherein the identification that the first region is inclined relative to the second region is an identification that at least part of the first region is inclined relative to at least part of the second region.

17. The method of claim 16, further comprising repeating the receiving, receiving, calculating, comparing and identifying steps for a first subregion of the first region and a second subregion of the second region.

18. A computer-implemented method for identifying region incline from overhead imagery, the method comprising:
   receiving shadow data for at least one first ground object depicted in a first region of an overhead image, wherein the shadow data comprises a length of the respective first ground object as identified from the overhead image;
   receiving shadow data for at least one second comparable ground object depicted in a second region of the overhead image, wherein the shadow data comprises a length of the respective second ground object as identified from the overhead image;
   calculating a statistical measure describing the variability of the shadow lengths between objects in the first region and the second region;
   comparing the statistical measure to a predetermined threshold; and
   based on the comparison, identifying that the first region is inclined relative to the_second region.

19. An apparatus comprising
at least one processor; and
at least one memory including computer program code;
the at least one memory and the computer program code configured to, with the at least one processor, cause the apparatus to:
   receive shadow data for at least one first ground object in a first region, wherein each first ground object is depicted in one overhead image of the first region, wherein the shadow data comprises a length of the respective first ground object as identified from the respective overhead image;
   receive shadow data for at least one second comparable ground object in a second region, wherein each second ground object is depicted in one overhead image of the second region, wherein the shadow data comprises a length of the respective second ground object as identified from the respective overhead image;
   calculate a statistical measure describing the variability of the shadow lengths between objects in the first region and the second region;
   compare the statistical measure to a predetermined threshold; and
   based on the comparison, identify that the first region is inclined relative to the second region.

20. A non-transitory computer-readable medium comprising computer-readable instructions which, when executed on an computer, cause the computer to:
   receive shadow data for at least one first ground object in a first region, wherein each first ground object is depicted in one overhead image of the first region, wherein the shadow data comprises a length of the respective first ground object as identified from the respective overhead image;
   receive shadow data for at least one second comparable ground object in a second region, wherein each second ground object is depicted in one overhead image of the second region, wherein the shadow data comprises a length of the respective second ground object as identified from the respective overhead image;
   calculate a statistical measure describing the variability of the shadow lengths between objects in the first region and the second region;
   compare the statistical measure to a predetermined threshold; and
   based on the comparison, identify that the first region is inclined relative to the second region.

* * * * *